(12) United States Patent
Olkin et al.

(10) Patent No.: US 7,376,835 B2
(45) Date of Patent: May 20, 2008

(54) IMPLEMENTING NONREPUDIATION AND AUDIT USING AUTHENTICATION ASSERTIONS AND KEY SERVERS

(75) Inventors: Terry M. Olkin, Los Gatos, CA (US); Jahanshah Moreh, Los Angeles, CA (US)

(73) Assignee: Secure Data In Motion, Inc., San Mateo, CA (US)

(*) Notice: Subject to any disclaimer, the term of this patent is extended or adjusted under 35 U.S.C. 154(b) by 712 days.

(21) Appl. No.: 10/707,191

(22) Filed: Nov. 25, 2003

(65) Prior Publication Data

US 2004/0151323 A1 Aug. 5, 2004

Related U.S. Application Data

(63) Continuation-in-part of application No. 10/707,190, filed on Nov. 25, 2003, which is a continuation-in-part of application No. 10/305,726, filed on Nov. 26, 2002, which is a continuation-in-part of application No. 09/558,691, filed on Apr. 25, 2000, now Pat. No. 6,584,564.

(51) Int. Cl.
*H04L 9/00* (2006.01)

(52) U.S. Cl. ............... 713/168; 713/155; 713/176; 380/278; 705/75

(58) Field of Classification Search ........... 713/168; 705/75
See application file for complete search history.

(56) References Cited

U.S. PATENT DOCUMENTS

| | | | |
|---|---|---|---|
| 4,897,875 A | 1/1990 | Pollard et al. ........... 380/21 |
| 5,200,999 A | 4/1993 | Matyas et al. | |
| 5,495,533 A * | 2/1996 | Linehan et al. ........... 713/155 |
| 5,748,735 A | 5/1998 | Ganesan ........... 380/21 |
| 5,841,865 A | 11/1998 | Sudia ........... 380/21 |
| 5,848,161 A | 12/1998 | Luneau et al. ........... 380/49 |
| 5,864,667 A | 1/1999 | Barkan | |
| 6,009,173 A | 12/1999 | Summner | |

(Continued)

OTHER PUBLICATIONS

Australian Patent Office, Written Opinion, App. No. SG 200503239-6, Date of mailing Dec. 22, 2005 [a report prepared for and communicated to the Singapore Registry of Patents and ultimately received by Applicant on Mar. 8, 2006].

*Primary Examiner*—Gilberto Barron, Jr.
*Assistant Examiner*—Shewaye Gelagay
(74) *Attorney, Agent, or Firm*—Patent Venture Group; Raymond E. Roberts

(57) ABSTRACT

A communication system (410) wherewith sources (414) and targets (416) employ a key server (420) to exchange transactions (424). A first request to the key server includes a source assertion (422) from an authentication authority (418), and optionally a key (430). The key server provides a transaction ID (428), and the key if not already provided, in reply to this request. The key server stores the transaction ID and source assertion. The source encrypts the transaction and sends it with the transaction ID to the targets. A second request to the key server includes a target assertion and the transaction ID. The key server provides the key in reply to this request. The key server also stores the target assertion in association with the transaction ID. The respective assertions then establish the source and targets of the transaction in a manner that cannot plausibly be repudiated.

27 Claims, 17 Drawing Sheets

U.S. PATENT DOCUMENTS

| | | | |
|---|---|---|---|
| 6,023,700 A | 2/2000 | Owens et al. | 707/10 |
| 6,055,314 A | 4/2000 | Spies et al. | 380/21 |
| 6,230,156 B1 | 5/2001 | Hussey | 707/10 |
| 6,289,105 B1 | 9/2001 | Murota | 380/286 |
| 6,442,686 B1 * | 8/2002 | McArdle et al. | 713/151 |
| 7,146,009 B2 * | 12/2006 | Andivahis et al. | 380/277 |
| 2003/0147536 A1 | 8/2003 | Andivahis et al. | 380/277 |
| 2004/0128541 A1 * | 7/2004 | Blakley et al. | 713/201 |
| 2004/0139319 A1 * | 7/2004 | Favazza et al. | 713/168 |

* cited by examiner

| No | Field | Type | Description |
|---|---|---|---|
| 1. | ResourceID | String | A unique ID assigned to this communication |
| 2. | ResourceType | Integer | The application type (e.g., email, instant messaging, etc.) |
| 3. | ResourceKey | Binary | The encryption key |
| 4. | KeySize | Integer | The size of the key |
| 5. | KeyCreator | String | The ID of the key creator |
| 6. | KeyOwner | String | The ID of the key owner |
| 7. | DateCreated | Date | The date and time when the key was created |
| 8. | ReleaseAfter | Date | The date and time before which the key should not be released (per recipient) |
| 9. | ExpireOn | Date | The date and time after which the key should not be released (per recipient) |
| 10. | LastRelease | Date | The last date time the key was released (per recipient) |
| 11. | ExpectedRequest | Date | The date and time by which the key is expected to be requested (per recipient) |
| 12. | NumReleased | Integer | The number of times the key was released (per recipient) |
| 13. | NumReleases | Integer | The number of times the key should be released (per recipient) |

TABLE 1

FIG. 6a: Basic user information table (Users)

| Column Name | Type | Description |
|---|---|---|
| UserId | integer | Internal user identifier |
| Password | raw | Hash of user's password |
| Salt | integer | Salt added to password before hash |
| Status | varchar | User's current registration/usage status |

FIG. 6b: Sent messages table (SentMail)

| Column Name | Type | Description |
|---|---|---|
| MessageId | integer | Unique email identifier |
| SenderId | integer | Internal sender identifier (ref to Users) |
| DateSent | date | Time and date record entered |
| NumRecipients | integer | Number of users message was sent to |
| MessageKey | raw | Key used to encrypt/decrypt message |
| MaxDeliveries | integer | Maximum times key is delivered to each user |
| Expiration | date | Time after which message should not be delivered |
| SealSalt | integer | Secret salt added to hash to form seal |
| Subject | varchar | The subject of the message |
| LastRead | date | The date the message was last read |
| DeliverAfter | date | The date after which the message may be read |

FIG. 6c: Email destinations (Receivers)

| Column Name | Type | Description |
|---|---|---|
| MessageId | integer | Email message's identifier (ref to SentMail) |
| ReceiverAddr | integer | Receiver's e-mail address |
| FirstRequest | date | Time the receiver first attempts to read |
| NumRequests | integer | Number of times receiver requested to read |

FIG. 6d: Alternate user identities (UserAliases)

| Column Name | Type | Description |
| --- | --- | --- |
| EmailAddress | varchar | Alternate email address |
| UserId | integer | Reference to Users table. |

FIG. 6e: Distribution list master (Distributions)

| Column Name | Type | Description |
| --- | --- | --- |
| DistributionId | integer | Unique list identifier |
| OwnerId | integer | User who owns list (ref to Users). |
| ListName | varchar | Email address of this list |

FIG. 6f: Distribution list members (ListMembers)

| Column Name | Type | Description |
| --- | --- | --- |
| DistributionId | integer | Reference to Distributions |
| MemberAddress | varchar | Name of alias on the list |
| Administrate | char | Y=member can update list, N=cannot |

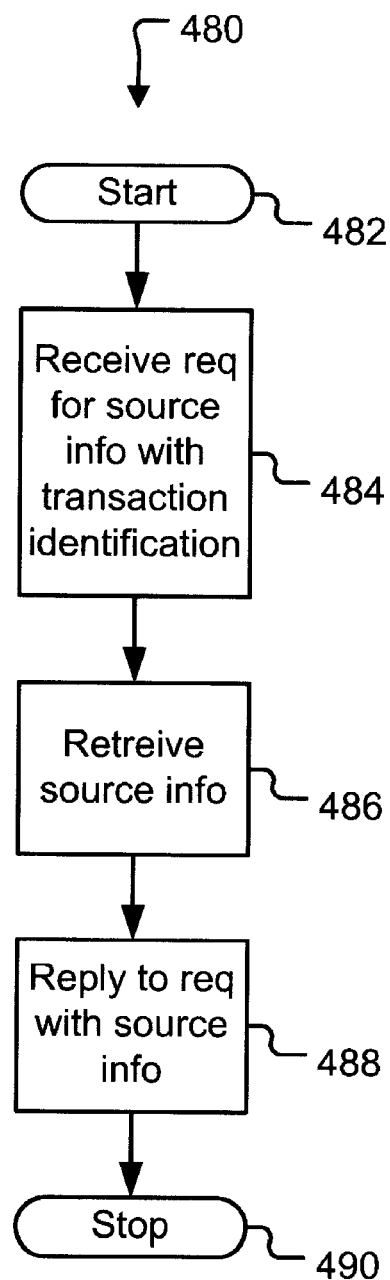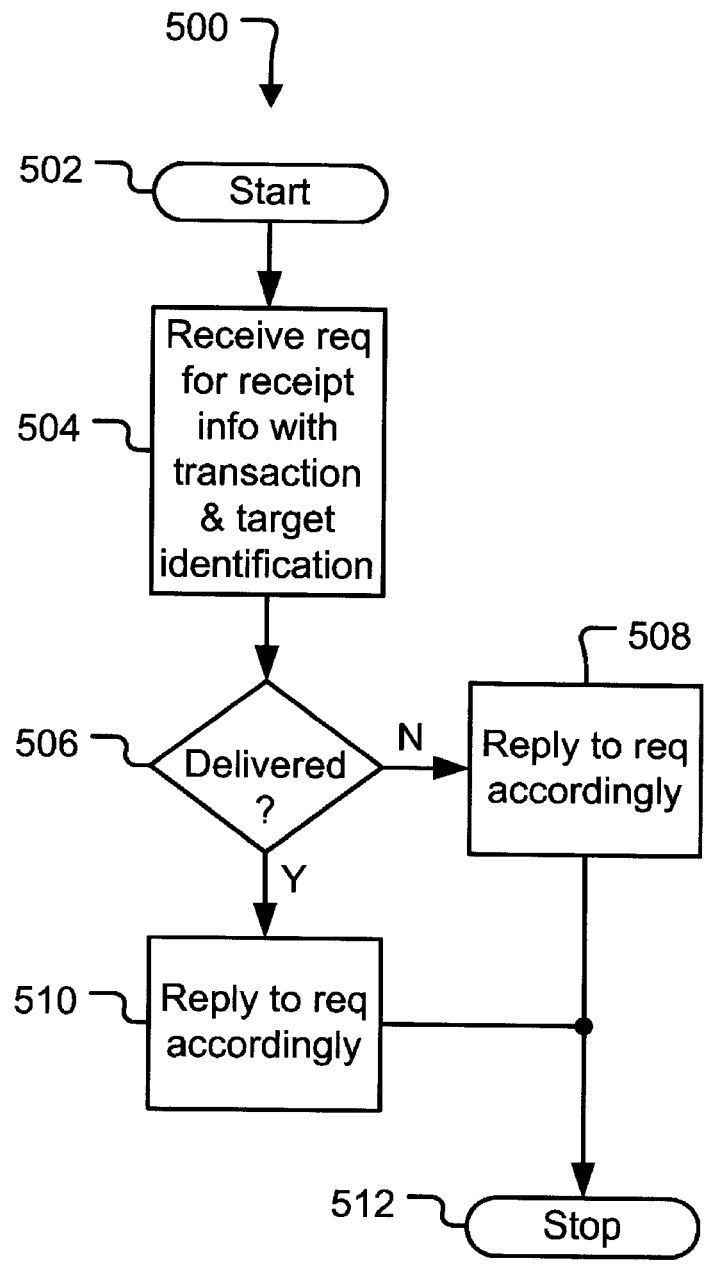
FIG. 17
FIG. 18

IMPLEMENTING NONREPUDIATION AND AUDIT USING AUTHENTICATION ASSERTIONS AND KEY SERVERS

CROSS REFERENCE TO RELATED APPLICATIONS

This is a continuation-in-part of application Ser. No. 10/707,190, filed Nov. 25, 2003, which is a continuation-in-part of application Ser. No. 10/305,726, filed Nov. 26, 2002, which is a continuation-in-part of application Ser. No. 09/558,691, filed Apr. 25, 2000, now issued as U.S. Pat. No. 6,584,564 on Jun. 24, 2003.

BACKGROUND OF INVENTION

1. Technical Field

The present invention relates generally to providing security for messages communicated in networks, including the Internet, and specifically to establishing information to audit the messages and make them nonrepudiate able.

2. Background Art

Virtually every user of electronic communications mediums has at some time or another paused to wonder about the security of communications within those systems. Various reasons exist for concern in this regard, probably ones far too numerous to cover here, but a few examples include having to depend on complex technologies, having to rely on unknown and possibly untrustworthy intermediaries, and the increasing anonymity in our electronic networks due to the distances which communications may travel and the masses of people which we may now reach.

Existing communications systems have had a long time to establish security mechanisms and to build up trust in them by their users. In the United States our conventional postal mail is a good example. We deposit our posted letters into a receptacle which is often very physically secure. Our letters are then picked up, sorted, transported, and ultimately delivered to a similar receptacle for retrieval by their recipients. Between the receptacles of a sender and a receiver the persons handling a letter are part of a single organization (at least intra-nationally) that is well known to us and considered to be highly trustworthy. Even on the rare occasions when the security of our postal system does fail, it has mechanisms to quickly detect and to correct this.

Unfortunately, most of us do not have anywhere near a similar degree of trust in the security of electronic communications as they pass between senders and receivers in our modern networks. We generally trust only in our ability to maintain the security of our sending and receiving "receptacles" for messages, such as e-mail, instant messages, video-conferences, collaborative documents, etc. This is because these receptacles are personal computers (PCs), workstations, Internet appliances, etc. that are within our personal physical control. We also typically appreciate that we have much less control over what goes on in the electronic medium between such receptacles. For instance, potentially any number of miscreants might receive and copy an unsecured message without its sender and intended receivers being any the wiser. Even worse, in many cases, electronic communications can be lost in transit, maliciously altered, fraudulently concocted entirely, or later simply repudiated.

The problem of e-message security is severe and is already receiving considerable attention. Legal mechanisms have already been put into place, and stronger ones continue to be put into place, at least for e-mail messages, to punish and to discourage security breaches. However, the very beneficial ability of electronic messages to travel so far and so swiftly as they can also means that they may cross legal boundaries, potentially hampering such legal efforts and definitely creating a crisis in user confidence.

Old technologies have been revived and extended for use in the new electronic medium, and often these are variations of ones long used in combination with conventional postal systems to obtain heightened security there. Thus we are seeing a resurgence of interest in and the use of cryptography.

Many of the existing systems for securing electronic communications are unwieldy, not well trusted, or both. The very electronic systems which have made modern electronic communications possible and efficient have already made many conventional cryptographic systems obsolete, or at least highly suspect. Equally or more modern computer systems have the ability to perform staggering numbers of tedious operations in a massively parallel manner, and many strong cryptographic systems of the past have now been shown to be no longer reliable.

New systems for securing electronic communications have emerged, however. The last 25 years have seen the introduction, rapid development, and more recently the application of public-key and private-key based systems commonly termed a "public key infrastructure" (PKI). These are presently quite popular, but perhaps prematurely and unduly.

The foundation of the PKI system is generally attributed to work done by Ron Rivest, Adi Shamir, and Leonard Adleman at the Massachusetts Institute of Technology in the mid 1970's. The result of that work, commonly known as the RSA algorithm, is a cryptosystem wherein both a public and a private key are assigned to a principal. The public key is revealed to all, but the private key is kept secret. The keys used are both large prime numbers, often hundreds of digits long, and the inherent strength of the RSA algorithm lies in the difficulty in mathematically factoring large numbers.

To send a message securely the message is encrypted using the public key of its intended recipient (here the principal). The message can then only be decrypted and read by the recipient by using their private key. In this simple scenario anyone can send messages to the recipient which only the recipient can read.

A highly beneficial feature of the PKI approach is that a sender can also be a principal and can send a message which only they could have sent. i.e., a non-repudiable message. For this the sender encrypts a message (often only a part of what will be a larger message) using their private key. A recipient then knows that the purported or disputed sender is the true sender of the message, since only using that sender's public key will work to decrypt the message.

In practice, the sender and the receiver often are both principals in PKI systems. The sender encrypts a "signature" using their private key, then embeds this signature into their message, and then encrypts the result using the recipient's public key. The message then is secure from all but the recipient. Only the recipient can decrypt the message generally, using their private key, and once that is done the recipient may further use the sender's public key to specifically decrypt the signature. In this manner the receiver may rest assured that the sender is the true, nonrepudiable, source of the signature (and implicitly the entire message; but this works more securely still if the signature uniquely includes something like a hash of the general message).

As the presence of the term "infrastructure" in PKI implies, however, this popular cryptographic system requires a considerable support system. The public keys must be published so that those wishing to send a message can determine the keys for the intended message recipients. Additionally, public keys are certified for a specific period of time (e.g., one year) and must be renewed. Finally, if the private key is compromised or suspected as having been compromised, the corresponding public key must be revoked. Consequently, any communicating party must check the revocation status of a public key before using it to encrypt messages or verify signatures. These tasks are usually handled by a "certification authority." Unfortunately, as the marketplace in our competitive society is now demonstrating, this can lead to a plurality of certification authorities all vying for acceptance and thoroughly confusing the potential users. Moreover, the lifecycle of public keys (creation, distribution, renewal, and revocation) can lead to complex and unmanageable deployment scenarios.

Of course public and private key systems are possible without the use of a certification authority, say, among small groups wishing to carry out secure communications among themselves and where repudiation is not a concern. But as the very negative reaction by our government to initial publication of and about the RSA algorithm aptly demonstrated, true, unbridled security can be perceived as a threat to a government's ability to protect society. While it is probably now too late for most governments to fully suppress the use of ultra-strong cryptography, it also follows that such governments will be more receptive to cryptosystems that can be opened when truly appropriate (often termed "key escrow" systems).

PKI also has some other problems with regard to usability and efficiency. Since the keys are quite large, usually well beyond the capability of an average human to memorize, they are awkward to work with. Machine based storage and usage mechanisms usually must be employed just to handle the keys. This is a severe impediment to mobile use across multiple systems and to recovery after erasure from volatile memory, and it creates a whole host of additional problems related to protecting what effectively becomes a physical key needed to contain the private key. A receiver based key system, such as PKI, is also unwieldy in some situations. For example, if there are multiple intended recipients, a public key for each must be obtained and used to separately encrypt each message copy. This can encompass quite a severe computational burden as a list of intended message recipients grows in number. Accordingly, the common case in actual practice is that the message is first encrypted with a single symmetric key. The message key is then encrypted multiple times using each recipient's public key. Thus, the message itself is only encrypted once. It is the message key that is encrypted multiple times.

Accordingly, prior art cryptosystems and PKI systems, and the electronic message systems that employ these, provide many benefits. Unfortunately, even these have been found wanting. As it increasingly became apparent that it was desirable to improve on, augment, or even replace such systems the present inventors developed a "Secure E-Mail System" and a "Security Server System". These are respectively covered in U.S. Pat. No. 6,584,564 and U.S. application Ser. No. 10/305,726, hereby incorporated by reference in their entirety.

The approaches discussed above have considerably improved digital message communications, but they have still left room for further improvement. For example, many businesses use digital communication to conduct business with their customers, suppliers, partners, and other business associates. Digital communication (e.g., electronic mail, enterprise instant messaging (EIM), etc.), like non-digital communication (e.g., paper mail) is seldom a stand-alone process. Often, digital communication is a step in the overall business process flow and is triggered by a business event. For example, when a financial brokerage company determines that a customer's margin call is due it must send the customer a notice. The brokerage company may follow up with a phone call. The ability of the business to determine if the customers have opened their notices impacts the process of calling the customers to follow up. In this example, if the business can prove that the customer has opened the notice, then it need not call the customer to follow up. This can result in a reduced number of customer follow up calls, which in turn translates into savings for the business.

For illustration purposes we will use electronic email to provide background. E-mail is good for this because it always involves a transaction (the e-mail), a transaction originator (the sender of the e-mail), and transaction targets (one or more recipients of the e-mail). It also assumes a decoupled environment, where the sender and recipients do not directly communicate with each other. The reading of an e-mail constitutes an event, and not reading an e-mail within a specified period of time also constitutes an event. Knowledge of such events can be particularly useful, both in business and other contexts.

Existing systems for digital message communications, such as the example described above in a business processes context, have a number of limitations. For instance, they are not transparent. The existing technology they use, such as a Public Key Infrastructure (PKI), requires user participation in acknowledging receipt of the communicated data. They do not support both action and the lack of action. In the existing technology such systems usage only provides knowledge about receipt of the communicated data. These systems fail to provide any information about the lack of receipt. Existing systems are also not decoupled. The existing technology they use, such as web-based communication, requires the sender of communication data to directly connect with the recipient. The existing systems also require voluntary participation by the recipients. A return-receipt e-mail, for example, requires voluntary participation by the recipient. If the recipient chooses not to acknowledge receipt of the communication, the originator cannot discern the difference between this event and the recipient not receiving the communication at all. The limitations make existing systems unduly recipient controlled, or not controlled at all, rather than originator-controlled. Existing technology, such as PKI-based e-mail, also does not permit an originator to control when a recipient can view the data. Once a message is transmitted, the recipients can view the data as soon as they receive it. Existing systems are often also constrained by the size of the communication data. Existing technologies, such as web-based communication, are dependent on the size of the communication data. The larger the data, the more memory and processing power is required for the underlying system. This unpredictability results in difficulties in managing the expected capacity of the communication systems.

Accordingly, prior art cryptosystems, and PKI systems in particular, have also proven to be wanting when it comes to determining events related to digital communications, including but not necessarily limited to business communications. As this increasingly became apparent, the present inventors developed a "System For Implementing Business Processes Using Key Server Events." This is covered in U.S. patent application Ser. No. 10/707,190, hereby incorporated by reference in its entirety.

The approaches discussed above have still not addressed all concerns with the use digital communications. The general prior art systems, as well as the prior work by the present inventors, have not provided ways to that well address two particularly vexing problems: communication nonrepudiation and auditing.

Existing systems for digital message communications that attempt to provide either nonrepudiation or auditing have a number of limitations. For instance, these systems are not transparent. Technologies such as PKI burden the user with maintaining a private key and actively using it for producing a signature. Additionally, a party needing to verify a transaction must have a copy of, or otherwise retrieve the digital certificate of the transaction signer. Moreover, existing technologies do not provide a single service for both nonrepudiation and audit. PKI-based technologies require the use of a Public Key Infrastructure that is trusted by all parties (both originator and target of a transaction). Non-PKI technologies (e.g., storing a transaction log in a database) use a completely different mechanism and do not interoperate with PKI. The existing systems thus use PKI-based technology or non-PKI technology, but are unable to practically interoperate with both and yet not require either. The existing technologies also offer only a single level of strength for nonrepudiation, when varying degrees are usually appropriate for varying situations. For example, in PKI the strength of nonrepudiation is equivalent to the assurance level of the underlying certificate. The transacting party can only change the strength by using a different certificate, having a different level of assurance. Existing technologies also provide rigid trust rules for nonrepudiation and audit. For example, in a PKI system the party that verifies the transaction must trust the certificate of the signer. In a non-PKI system, the verifier must trust the system that keeps the transaction logs.

Accordingly, prior art crypto and PKI systems have not adequately solved the problems of nonrepudiation and auditing in digital message communications.

SUMMARY OF INVENTION

Accordingly, it is an object of the present invention to provide security for messages communicated in networks such as the Internet.

Briefly one preferred embodiment of the present invention is a method for a transaction source and a transaction target to exchange a transaction that cannot be repudiated.

A first request for a transaction identifier to identify the transaction is received, wherein this request includes a source authentication assertion. The source authentication assertion is then verified. The transaction identifier and information from the source authentication assertion are stored, thereby establishing information making the transaction source unable to plausibly repudiate once it encrypts and sends the transaction. The transaction identifier is provided in reply to the first request so that the transaction and the transaction identifier can be sent to the transaction target. A second request for a decryption key to decrypt the transaction is received, once it has been received by the transaction target, wherein the second request includes the transaction identifier and a target authentication assertion. The target authentication assertion is then verified. Information from the target authentication assertion is also stored with the transaction identifier. And the decryption key is then provided in reply to the second request so that the transaction can be decrypted, and thereby establishing information making the transaction target unable to plausibly repudiate being a recipient of the transaction.

Briefly another preferred embodiment of the present invention is a method for establishing a transaction as nonrepudiate able by a transaction source that is the origin of the transaction. A request for a transaction identifier to identify the transaction is received, wherein this request includes a source authentication assertion. The source authentication assertion is then verified. The transaction identifier and information from the source authentication assertion are stored. And the transaction identifier is provided in reply to the request, thereby establishing information making the transaction source unable to plausibly repudiate being the origin of the transaction.

Briefly another preferred embodiment of the present invention is a method for establishing a transaction as nonrepudiate able by a transaction target that is a recipient of the transaction, wherein a transaction identifier identifying the transaction and a decryption key usable to decrypt the transaction have been pre-stored. A request for the decryption key is received, wherein this request includes the transaction identifier and a target authentication assertion. The target authentication assertion is then verified. Information from the target authentication assertion is stored with the transaction identifier. And the decryption key is provided in reply to the request, thereby establishing information making the transaction target unable to plausibly repudiate being a recipient of the transaction.

Briefly another preferred embodiment of the present invention is system for a transaction source and a transaction target to exchange a transaction that cannot be repudiated. A computerized key server is provided. The key server is suitable for receiving a first request, via a network, for a transaction identifier to identify the transaction, wherein this first request includes a source authentication assertion. The key server is also suitable for receiving a second request, via the network, for a decryption key usable to decrypt the transaction, wherein this second request includes the transaction identifier and a target authentication assertion. The key server is also suitable for verifying the source authentication assertion and the target authentication assertion. The key server is also suitable for storing the transaction identifier, information from the source authentication assertion, and information from the target authentication in association in a database. The key server is also suitable for providing a first reply to the first request, via the network, that includes the transaction identifier. And the key server is also suitable for providing a second reply to the second request, via the network, that includes the decryption key, thereby establishing information making the transaction source unable to plausibly repudiate once it encrypts and sends the transaction and also making the transaction target unable to plausibly repudiate once it is provided the decryption key.

Briefly another preferred embodiment of the present invention is a system for establishing a transaction as nonrepudiate able by a transaction source that is the origin of the transaction. A computerized key server is provided. The key server is suitable for receiving a request, via a network, for a transaction identifier to identify the transaction, wherein this request includes a source authentication assertion. The key server is also suitable for verifying the source authentication assertion. The key server is also suitable for storing the transaction identifier and information from the source authentication assertion in a database. And the key server is also suitable for providing a reply, via the network, that includes the transaction identifier, thereby establishing information making the transaction source unable to plausibly repudiate once it encrypts and sends the transaction.

Briefly another preferred embodiment of the present invention is a system for establishing a transaction as nonrepudiate able by a transaction target that is a recipient of the transaction, wherein a transaction identifier identifying the transaction and a decryption key usable to decrypt the transaction have been pre-stored in a database. A computerized key server is provided. The key server is suitable for receiving a request, via a network, for the decryption key, wherein this request includes the transaction identifier and a target authentication assertion. The key server is also suitable for verifying the target authentication assertion. The key server is also suitable for storing information from the target authentication assertion with the transaction identifier in the database. And the key server is also suitable for providing a reply, via the network, that includes the decryption key, thereby establishing information making the transaction target unable to plausibly repudiate.

An advantage of the present invention is that it provides a single service for both nonrepudiation and audit.

Another advantage of the invention is that it permits multiple levels of strength for nonrepudiation, to use when varying degrees are appropriate for varying situations.

And, another advantage of the invention is that it is nonburdensome to users, not relying on the need for pre-obtained keys, digital certificates, directories to look up such data in beforehand for all transaction targets, and all transacting parties having to use a rigid uniform scheme for such.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended drawings and table in which:

TABLE 1 shows the schema for the content of a database maintained by a key server.

FIG. 2a-c depict e-mail forms which may be used by the embodiment in FIG. 1, wherein FIG. 2a is a conventional send form, FIG. 2b is a send form which is modified to work with the embodiment in FIG. 1, and FIG. 2c is a conventional receive form;

FIG. 6a-e are the tables in FIG. 5 with descriptions for the fields used therein, wherein FIG. 6a is of user data, FIG. 6b is of message data, FIG. 6c is of destination data, FIG. 6d is of alias data for users, FIG. 6e is of optional distribution list data, and FIG. 6f is of member data for such distribution lists;

FIG. 17 is a flow chart depicting a suitable process by which data established in the database can be used to counter attempted repudiation by the source; and FIG. 18 is a flow chart depicting a suitable process by which data established in the database can be used to counter attempted repudiation by the target.

DETAILED DESCRIPTION

Figure 1:
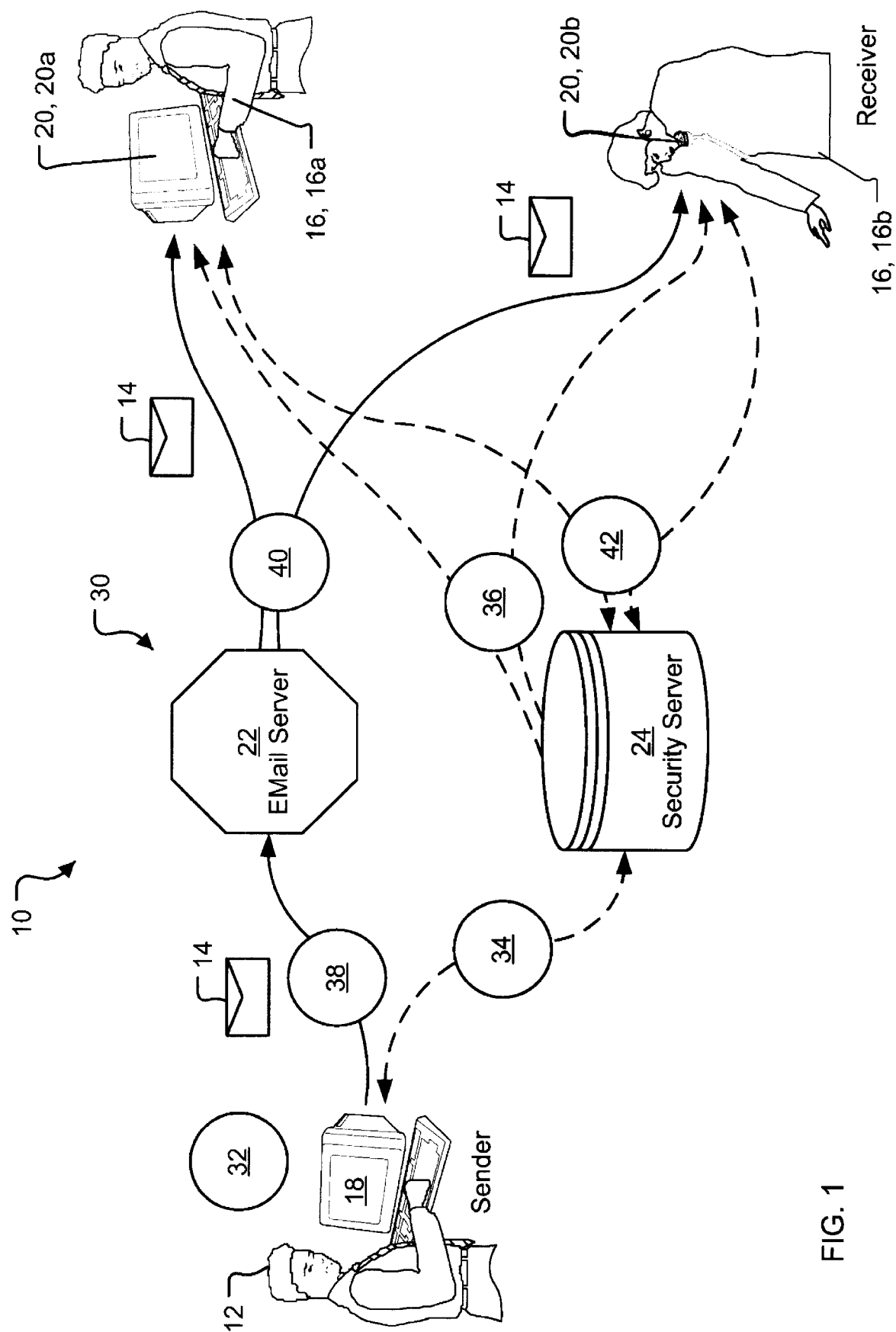
FIG. 1 is a schematic overview diagram generally depicting information flow in the context of an example secure e-mail system.

Best Mode for Carrying Out the Invention

Unknown; A preferred embodiment of the present invention is a system for implementing nonrepudiation and audit using authentication assertions and key servers. As illustrated in the various drawings herein, and particularly in the view of FIG. 15, preferred embodiments of the invention are depicted by the general reference character 410.

Before discussing the present inventive communication system 410, we first discuss the background of key servers for secure messaging. This is essentially the content of application Ser. No. 10/707,190, application Ser. No. 10/305,726, and U.S. Pat. No. 6,584,564 by the present inventors.

FIG. 1 is a schematic overview diagram generally depicting information flow in a secure e-mail system 10. A sender 12 uses the secure e-mail system 10 to send a secure e-mail 14 to one or more receivers 16. To accomplish this the sender 12 employs a suitable sending unit 18 to create and send the secure e-mail 14, and the receivers 16 then employ suitable receiving units 20 to receive and view the secure e-mail 14. The secure e-mail system 10 further includes an e-mail server 22, which is essentially conventional, and a security server 24 (a form of key server, as discussed presently), that along with software modules 26 (FIG. 3) in the sending units 18 and the receiving units 20 constitute the primary new elements in the secure e-mail system 10.

The sending units 18 and the receiving units 20 are suitable combinations of hardware and software. They may be either similar or different hardware, and in FIG. 1 this is emphasized by depicting the sending unit 18 and a first receiving unit 20a as being personal computers (PCs), and the second receiving unit 20b as being an Internet appliance.

The sending unit 18 must have sending capability, and in many cases it will also be utilized to compose the secure e-mail 14. However, composition capability is not necessarily a requirement and, for example, an Internet appliance such as a cell-phone with pre-stored standard messages may also be used. The receiving units 20 must be capable of receiving the secure e-mail 14 and they may, optionally, also have message composition and other capabilities.

With respect to the software required, each sending unit 18 and receiving unit 20 will need suitable e-mail type applications and suitable instances of the software modules 26. The e-mail type applications may be conventional e-mail applications, or they may be browsers having integrated e-mail capability, or they may be e-mail applets operating in conventional browsers. The software modules 26 will be described in more detail presently, but it can be noted here that these can be installed almost contemporaneously with their first use in a sending unit 18 or a receiving unit 20.

In FIG. 1 both a first receiver 16a and a second receiver 16b are depicted to emphasize that the secure e-mail system 10 may be used to send to multiple receivers 16. Thus, common e-mail addressing conventions such as "To . . . ," "Cc . . . ," "Bcc . . . ," etc. may be used, and the secure e-mail system 10 may also be used to concurrently send to lists of multiple receivers 16.

For the following overview discussion it is presumed that the sender 12 and the first receiver 16a are registered within the secure e-mail system 10 and that the sending unit 18 and the first receiving unit 20a have been suitably provisioned with appropriate instances of the software modules 26 to operate in their respective roles in the secure e-mail system 10. It is further presumed that the second receiver 16b has not yet registered within the secure e-mail system 10 and that the second receiving unit 20b has not yet been provisioned to operate with the secure e-mail system 10.

The overview of FIG. 1 also depicts the major stages of sending a secure e-mail 14 in a network environment 30, such as the current Internet. In a stage 32 the sender 12 decides to send the secure e-mail 14. An e-mail message is therefore composed in some manner, conventional or otherwise.

In a stage 34, rather than use a "Send" command the sender 12 instead uses a "Send Securely" command to request transmission of the secure e-mail 14. However, rather than transmit the unsecured e-mail message immediately to the e-mail server 22, the sending unit 18 first contacts the security server 24 and provides it with various data items (the respective data items used in this stage and others are described presently). The security server 24 then authenticates the sender 12 and replies to the sending unit 18 with a unique message key and id for the present secure e-mail 14. The security server 24 also logs various data items for this transaction which may be used later. Using the message key, the sending unit 18 now encrypts the secure e-mail 14. The message body, encrypted or otherwise, is never sent to the security server 24.

In a stage 36 the security server 24 determines whether the receivers 16 are registered. If so, as is the case here only for the first receiver 16a, this stage is finished for such receivers 16. However, if a receiver 16 is not registered, as is the case here for the second receiver 16b, registration is then attempted. For this the security server 24 sends an e-mail message to the second receiver 16b, informing him or her that an encrypted message will be arriving soon and that he or she will need to register in order to read it. The second receiver 16b can then follow a universal resource locator (URL), which is included in the e-mail sent by the security server 24, to a routine for registering with the security server 24. The second receiving unit 20b may already have the necessary software module 26 for receiving and decrypting the secure e-mail 14, or such may be provided as part of the registration process. Once the second receiver 16b is registered and the second receiving unit 20b has the necessary software module 26 installed, this stage is complete.

Alternately, stage 36 can be skipped in the secure e-mail 14. The secure e-mail 14 can itself include a universal resource locator (URL), in plain form, that the receivers 16 can follow. The security server 24 thus need not be concerned with whether the receivers 16 are registered. The sender 12 can prepare and send the secure e-mail 14, as already described, and the receivers 16 can deal with whether or not they are registered and can read the secure e-mail 14 upon its arrival.

In a stage 38 the sending unit 18 sends the now encrypted secure e-mail 14. This can be essentially transparent or seamless to the sender 12, being handled in the software module 26 of the sending unit 18 by passing the now encrypted secure e-mail 14 to a conventional e-mail type application and automatically providing a suitable "Send" command. The secure e-mail 14 then proceeds in conventional manner to the e-mail server 22, arriving in the in-box of each of the target receivers 16. Notably, the body of the secure e-mail 14 is encrypted during the entire time that it is passing between the sending unit 18 and the receiving units 20. Optionally, the subject may also be encrypted during this time.

In a stage 40 the secure e-mail 14 arrives in the in-box of each receiver 16. When a receiver 16 opens the secure e-mail 14, using their receiving unit 20, the software module 26 for the receiving unit 20 detects that the secure e-mail 14 is encrypted. Depending upon its configuration, the software module 26 can then prompt the receiver 16 for a password or use one already known to it.

Finally, in a stage 42 the receiving unit 20 contacts the security server 24 and provides it with the message id and data for the receiver 16 (including their password). Assuming that the receiver 16 is an authorized recipient (as determined by the list of recipients in the original message), the security server 24 provides the message key to the receiving unit 20. Optionally, the security server 24 can also provide an indication of whether the secure e-mail 14 was altered in any way. With the message key the receiving unit 20 decrypts the secure e-mail 14 and the receiver 16 is able to read it.

Figure 2A:
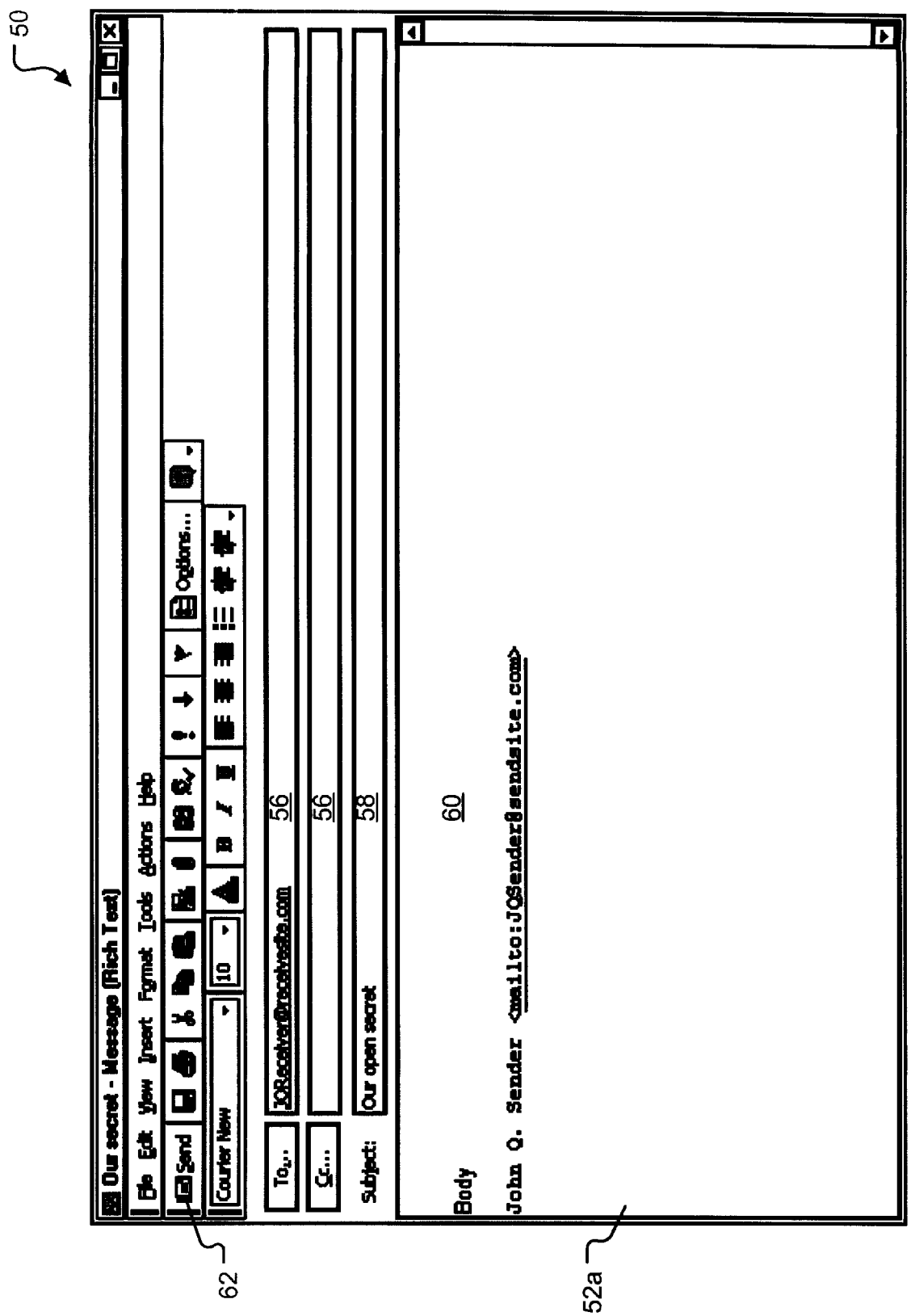
Figure 2B:
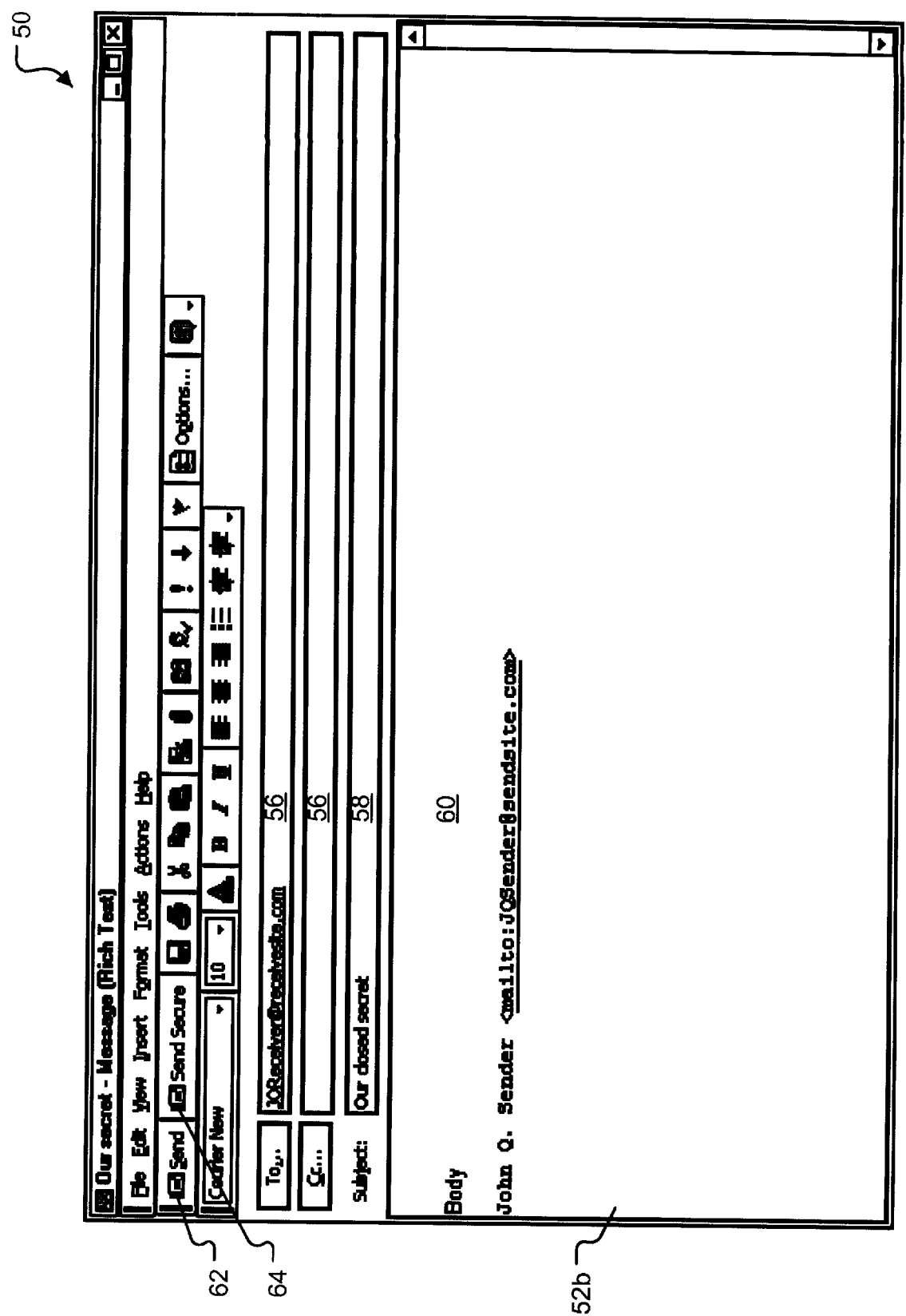
Figure 2C:
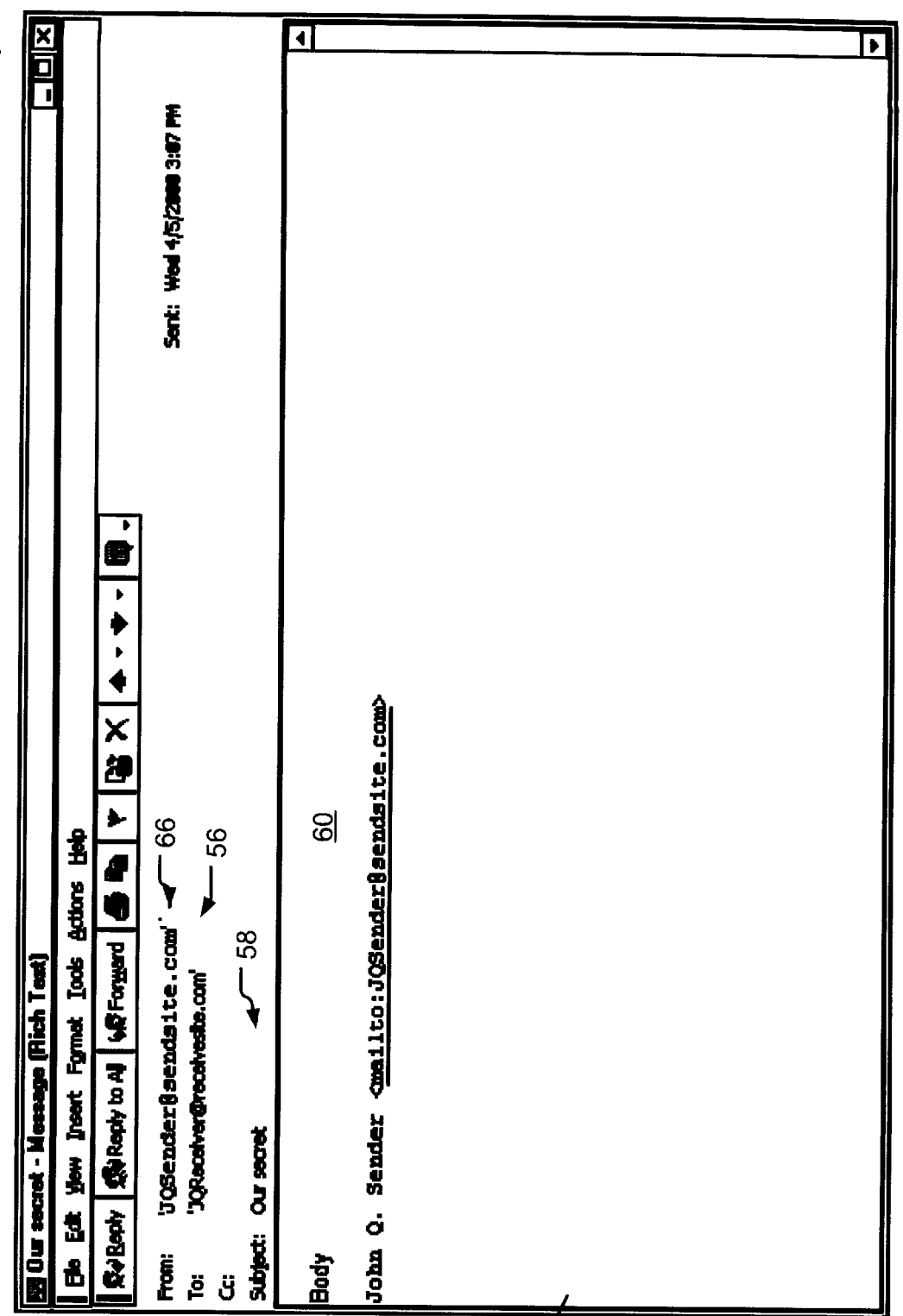

FIG. 2a-c depict e-mail forms 50 which the secure e-mail system 10 may use. FIG. 2a is a conventional send form 52a. FIG. 2b is a send form 52b that is essentially the same as send form 52a, but that is modified to work with the secure e-mail system 10. And FIG. 2c is a conventional receive form 54 that can be used with the secure e-mail system 10.

The send forms 52a-b both include receiver id fields 56, subject fields 58, and body fields 60. They also both include a conventional send button 62. The only difference between the send form 52a of FIG. 2a (conventional) and the send form 52b of FIG. 2b (modified) is that the latter also includes a send securely button 64. While it may be desirable in some embodiments to entirely replace the send button 62 with the send securely button 64, that is not anticipated to become common. The receive form 54 of FIG. 2c includes receiver id fields 56 (To: and Cc), a subject field 58, a body field 60, and also a sender id field 66. Understanding the various fields in these forms will be helpful for the following discussion.

Figure 3:
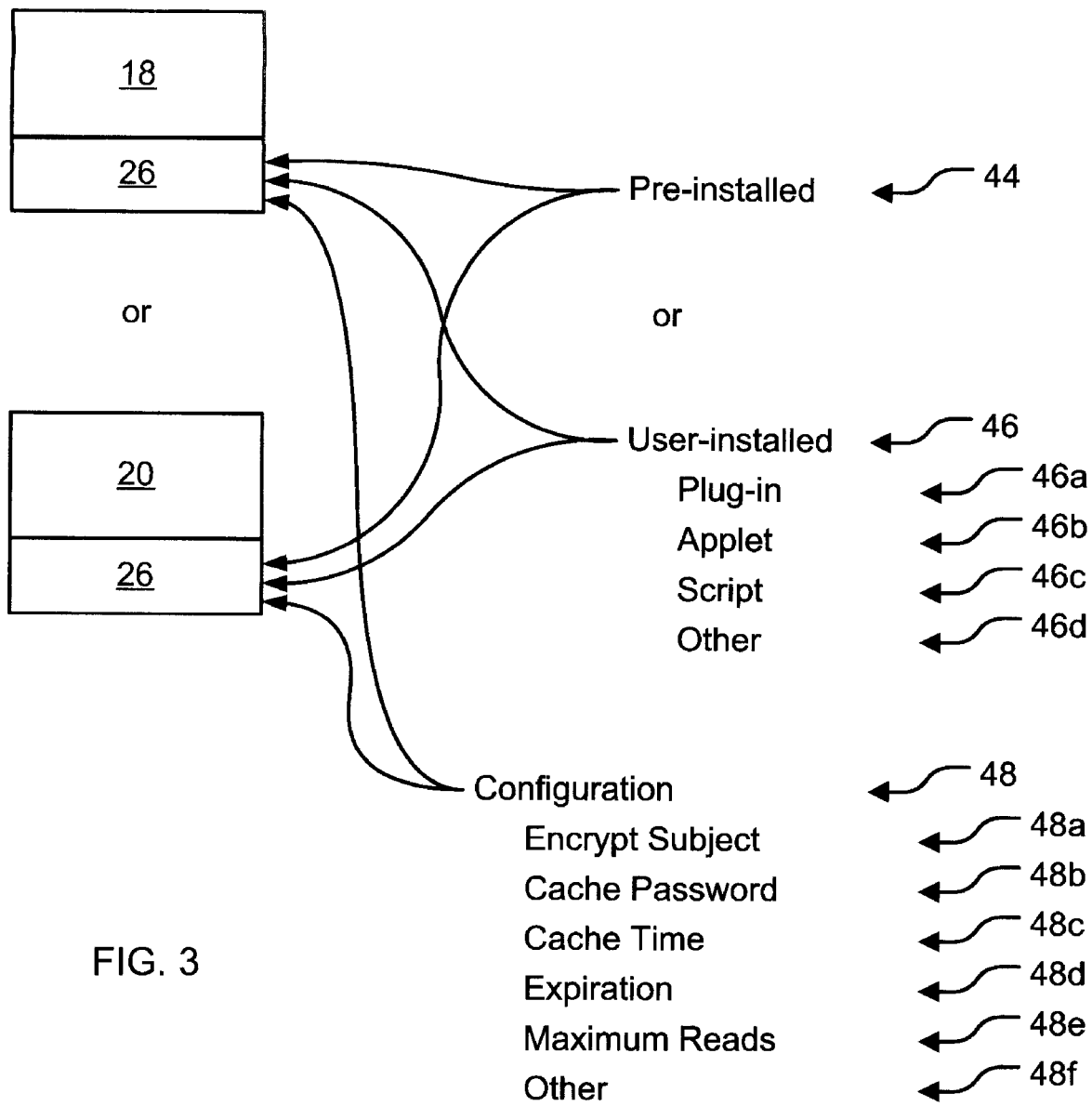
FIG. 3 is a block diagram depicting software modules which may be used in the sending and receiving units of FIG. 1.

FIG. 3 is a block diagram depicting the software modules 26 used in the sending unit 18 and receiving unit 20. In many embodiments of the secure e-mail system 10 the software modules 26 can be the same in both the sending unit 18 and the receiving unit 20, but this is not a requirement and different modules may also be used. The software modules 26 can be viewed as "client" side components of the secure e-mail system 10.

This figure also depicts various possible manners of installing the software modules 26 into the sending units 18 and receiving units 20. A pre-installed option 44 may be used whereby the underlying e-mail type application which is loaded onto a sending unit 18 or a receiving unit 20 comes with the software module 26 already included. Conventional e-mail specific applications or web-based e-mail applications may advantageously employ this pre-installed option 44.

Since a key goal of the secure e-mail system 10 is ease of use, employing it with web-based e-mail applications particularly facilitates operation by new users and simplifies operation by existing, sophisticated Internet users. Many Internet service providers (ISPs) today supply browser application software to their users. One example is America Online (AOL,™), which provides its users with a pre-configured "private label" browser application. The pre-installed option 44 permits including the secure e-mail system 10 in the private label browser, and minimizes any set-up burden. Default settings can be set for any configuration options, and the senders 12 and receivers 16 can then optionally tailor the software modules 26 as desired.

Alternately, a user-installed option 46 may be used wherein the software modules 26 are installed by the senders 12 and receivers 16, i.e., the end users, into their respective sending units 18 and receiving units 20. This user-installed option 46 permits use of the secure e-mail system 10 by the large body of Internet users which do not use private label applications.

The user-installed option 46 may be implemented in many variations. One variation 46a is permanent installation of the software module 26 as a plug-in. Another variation 46b is transitory "installation" of the software module 26 as an applet upon each use of the secure e-mail system 10, e.g., a Java applet obtained by using a particular web portal such as Yahoo!(™). Still another variation 46c is a script driven installation, i.e., essentially a conventional full blown software application installation rather than a compartmentalized plug-in type installation. And yet other variations 46d are possible, say, combinations of those described or even new approaches to installation entirely.

These variations 46a-d may employ downloading from a closely controlled server, such as the security server 24 (FIG. 1). Alternately, some of these may involve distribution by other means, such as loading the software module 26 from a compact disc (CD). CDs are a common way that private label applications are distributed, particularly private label browsers. Rather than distribute an application with the software module 26 already installed according to the pre-installed option 44, an application distribution CD can simply include the software module 26 as an option which the user can decide to install via the user-installed option 46.

Obtaining the software module 26 online provides some peripheral advantages, however. The senders 12 and receivers 16 can formally become registered with the secure e-mail system 10 at the same time and they can comply with any other formalities, such as certifying that they are able to accept and use encryption technology.

The variations 46a-d, to different degrees, also may facilitate upgrade options. For example, every time a software module 26 contacts the security server 24 it can include version information as part of its communication. In sophisticated embodiments the software modules 26 may self-upgrade, from the security server 24 or elsewhere, as upgrades become available. In less sophisticated embodiments or where re-certification may be required, information can be sent regarding how to upgrade. For instance, an e-mail message including an upgrade site URL can be send to a sender 12 or receiver 16.

FIG. 3 also depicts some possible configuration options 48 which the senders 12 and receivers 16 may change in the software modules 26. Suitable defaults can be provided in most, if not all situations, but sophisticated users or particular situations may merit changing these settings. While such configuration options 48 generally should persist from session to session, consistent with good security practice they should be associated with a user and not merely with a machine. Thus, where multiple senders 12 or receivers 16 may use the same sending units 18 or receiving units 20, the users may be allowed to set independent personal configurations.

Particular examples of settings in the configuration options 48 may include: an encrypt subject setting 48a, a cache password setting 48b, a cache time setting 48c, an expiration setting 48d, a maximum reads setting 48e, and others 48f.

The encrypt subject setting 48a controls whether a software module 26 encrypts the subject field 58 (FIG. 2a-c) as well as the body field 60 of the secure e-mail 14. The default typically will be to not encrypt the subject.

The cache password setting 48b permits specifying whether a password is required once per application session (e.g., per browser session), or whether a prompt requires the password every time it is needed. The default will generally be to cache the password but, as described next, this can work with a cache time setting 48c in a more secure manner. The password can also be cached only in memory and never to disk, for added security.

The cache time setting 48c works with the cache password setting 48b to control a maximum time which a password can be cached. Default and permitted maximum values for this might be 8 hours. A sender 12 could then shorten the cache time setting 48c, but not be allowed to lapse into poor security practices by specifying too high a time.

The expiration setting 48d allows a sender 12 to specify when the security server 24 (FIG. 1) should discard a message key, and thus make the secure e-mail 14 unreadable. The default will generally be to not explicitly force expiration, but after some substantially long period of time (perhaps years) the security servers 24 in most embodiments of the secure e-mail system 10 will probably need to do so.

The maximum reads setting 48e specifies the number of times that each receiver 16 can open and read a secure e-mail 14, i.e., the number of times that the message key will be sent to a single receiver 16. A default may be zero, meaning that there is no limit.

Of course, still other configuration options 48 may be provided, hence an others 48f element is present in FIG. 3 to emphasize this.

Once the software module 26 is installed in a sending unit 18 it is ready for use in message composition and send scenarios. A private label browser where the software module 26 is a plug-in type variation 46a will be used in the following discussion, but those skilled in the art will appreciate that the underlying principles are extendable, as well, to other systems which may use the secure e-mail system 10.

Figure 4:
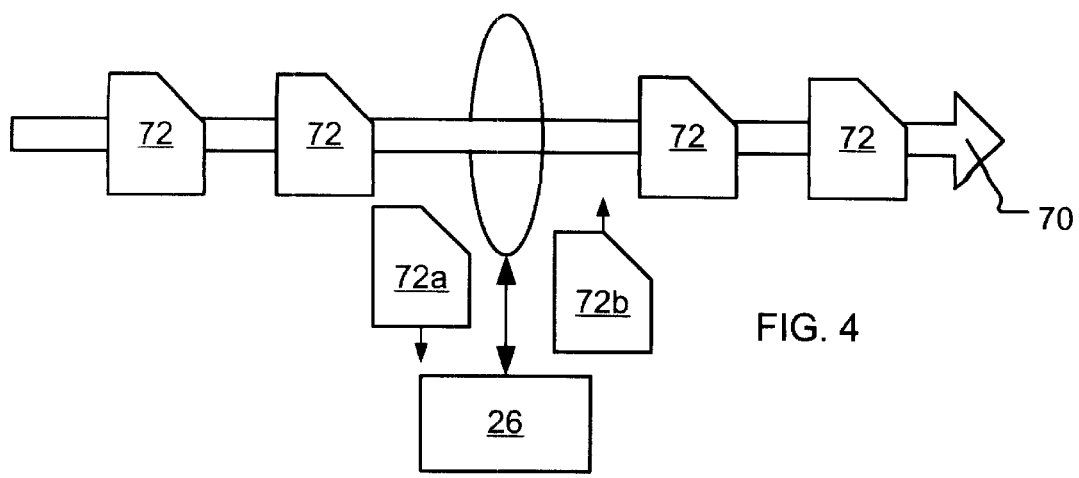
FIG. 4 is a block diagram stylistically depicting an approach for the software modules to determine whether a secure e-mail is being either sent or received.

FIG. 4 is a block diagram stylistically depicting a preferred approach for the software modules 26 to determine whether a secure e-mail 14 is being sent (or received). The software module 26 in the sending unit 18 examines a stream 70 of pages 72 looking for any which allow a sender 12 to compose a secure e-mail 14. One way to examine the stream 70 is for the software module 26 to see if the URL of a page 72 has a certain structure, e.g., "*mail.privatelabel.com*/Compose*" where * can match any pattern. Another way for the software module 26 to examine is to determine if the HTML content of a page 72 has a certain recognizable (static) pattern, e.g., the name of the form tag is "Compose." The software module 26 may also use MIME types to identify possible pages 72 to intercept. If an actual candidate page 72a is found it is removed from the stream 70, processed as now discussed, and replaced into the stream 70 as a processed page 72b.

Once the software module 26 determines that a page 72 about to be rendered is a composition type candidate page 72a, it needs to modify that candidate page 72a to include at least one new control, the send securely button 64 (FIG. 2b). Other controls in addition to this one button may be added if desired, but they are optional.

The send securely button 64 is "pressed" (operated, say, by a mouse click) by the sender 12 rather than their operating the conventional send button 62 when it is desired to send a secure e-mail 14. When the send securely button 64 is operated the software module 26 intercepts the page 72 (or form) containing the various fields of the e-mail which was about to be posted to the e-mail server 22, and modifies some of those fields. After this modification is complete the software module 26 executes the desired operation (post or send) exactly as would have happened had the sender 12 pressed the send button 62 in the first place. The only difference is that the values in some of the fields in the secure e-mail 14 will now be different, i.e., encrypted.

In the inventors' presently preferred embodiment only two fields are typically modified. The body field 60 is always modified by encrypting it. And depending on the configuration settings, specifically the encrypt subject setting 48a described above, the subject field 58 may also be changed.

Figure 5:
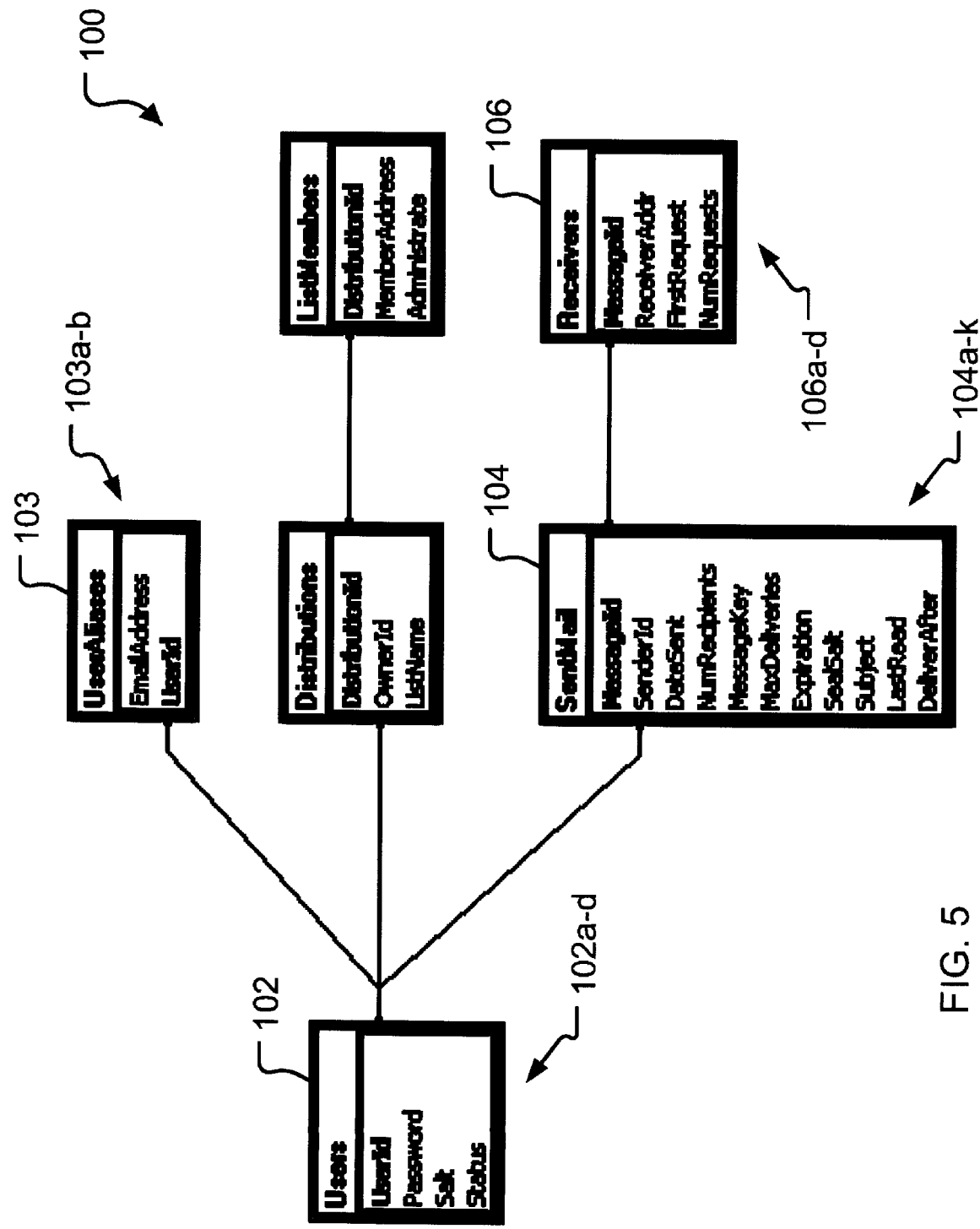
FIG. 5 is a diagram of a relational database including tables useable by the security server of FIG. 1.

Before examining the processes of encryption and decryption, some discussion of the various data items used by the secure e-mail system 10 is appropriate. FIG. 5 is a diagram of a database 100 including tables used by the secure e-mail system 10. The primary component of the security server 24 (FIG. 1) is this database 100. The registered senders 12 and receivers 16 are collectively treated within the database 100 as users, and data for them is stored in a users table 102.

The users table 102 includes records each having fields for: a userId 102a, a password 102b (actually a hashed version of the actual password in the preferred embodiment, as presently described), a salt 102c, and a status 102d.

Closely related to the users table 102 is a user aliases table 103, which includes records each having fields for: an emailAddress 103a and a userId 103b (relationally linked to the userId 102a in the users table 102).

The database 100 also includes a sentMail table 104. This includes records each having fields for: a messageId 104a, a senderId 104b, a dateSent 104c, a numRecipients 104d, a messageKey 104e, a maxDeliveries 104f, an expiration 104g, a sealSalt 104h, a subject 104i, a lastRead 104j, and a deliverAfter 104k.

A receivers table 106 is provided as well. As can be seen in FIG. 5, the messageId 104a in the sentMail table 104 is relationally linked to a messageId 106a in the receivers table 106. Thus, this receivers table 106 contains data for the receivers 16 specified in respective secure e-mails 14. The receivers table 106 further includes records each having fields for: a receiverAddr 106b, a firstRequest 106c, and a numRequests 106d.

FIG. 6a-f are tables of the data fields used by the preferred embodiment. The tables in FIG. 6a-d are important to the core operation of the secure e-mail system 10, while the tables of FIG. 6e-f relate to optional features of the secure e-mail system 10.

The text in the tables of FIG. 6a-d describes some of the particular fields, with the primary fields discussed further presently. FIG. 6a is the users table 102 of FIG. 5. This contains data records for each user, sender 12 or receiver 16, which is registered with the secure e-mail system 10. As each user registers, they are assigned a UserId (userId 102a) and they choose a Password (password 102b) that are stored here. The preferred value of the Password (password 102b) is H(p+s) where p is the cleartext password and 0 is a salt (salt 102c) concatenated with the cleartext password. FIG. 6b is the sentMail table 104 of FIG. 5. This contains data records for each secure e-mail 14 in the secure e-mail system 10. FIG. 6c is the receivers table 106 of FIG. 5. This contains destination data for each secure e-mail 14 which is to be deliverable by the secure e-mail system 10. Since a record gets generated in this table for each receiver 16 (individual or list group) of each secure e-mail 14 that is sent, it is expected that this table will be the largest by far in the secure e-mail system 10. A null value in the FirstRequest field (firstRequest 106c) implies that the receiver 16 has not requested to read the secure e-mail 14. FIG. 6d is the user aliases table 103 of FIG. 5. This contains data for all known e-mail addresses (emailAddress 103a) for each given user (userId 103b, relationally linked to userId 102a in the users table 102). Thus single users may be known by multiple e-mail addresses, or aliases.

The fields of FIG. 6e-f are not discussed further beyond the following. These tables are used by optional features, and the text in them provides sufficient detail such that one skilled in the art can appreciate the uses of these fields. FIG. 6e is a table of the data used to permit the use of e-mail distribution lists. This table allows the users to create distribution lists. An owner can always update the list, but the owner need not actually be a member of the list. This latter feature is particularly useful for list administrators. And FIG. 6f is a table of the data used to permit the use of the distribution lists. This table contains data about the members of each distribution list.

Of course, other tables and other fields for other data than this shown in FIG. 5 and FIG. 6a-f are also possible, and some of the above fields may be optional and can be omitted in some embodiments of the secure e-mail system 10.

Before encryption of a message can take place the software module 26 must obtain a password for the sender 12. If the password is cached, and if the cache time setting 48c has not been exceeded, this step is satisfied. Otherwise, the software module 26 can display a dialog box which prompts the sender 12 to enter their password. Conventional password handling features can be provided, such as displaying the password only as asterisks and permitting the sender 12 to cancel to abort sending.

In the preferred embodiment the passwords of the senders 12 and the receivers 16 are not the passwords 102b stored in the users table 102. Instead, as a heightened security option, the user picks a password, and this and the salt 102c are hashed by the security server 24 to obtain the password 102b. The user's chosen password is communicated to the security server 24, where a hash of it and the salt 102c takes place and is stored as the password 102b in the database 100. The cleartext of the user's password is not stored at the security server 24, only a computed hash which cannot be computed without the original password.

In this manner the security server 24 never need know, or be able to know, the actual user's password. This option is discussed further, presently.

Once the password 102b is obtained, the software module 26 can perform the operations of encryption and actual sending. In general, the software module 26 sends a request to the security server 24 via secure socket layer (SSL) protocol to authenticate the sender 12 and to obtain back a messageKey 104e for use to encrypt the secure e-mail 14. The software module 26 then encrypts the body field 60 (and optionally also the subject field 58) of the message and the result is then separately encoded to create the secure e-mail 14.

The use of secure socket layer (SSL) was mentioned above. Since a goal of the present secure e-mail system 10 is ease of use, the inventors' present preferred embodiment employs SSL. It is currently considered secure in the industry, being widely used in common browsers, with the average Internet user today using it and not even being aware that they are doing so. It should be appreciated, however, that the use of SSL is not a requirement. Other security protocols may alternately be used.

These notations are now used in the following discussion:
$K_m$=One-time, unique key associated with an e-mail;
$P_s$=Sender's password;
$P_r$=Receiver's password;
$\{p\}_k$=p encrypted with key k;
$\{p\}_{ssl}$=p encrypted with the SSL session key; and
H(p)=One-way hash of p.

Figure 7:
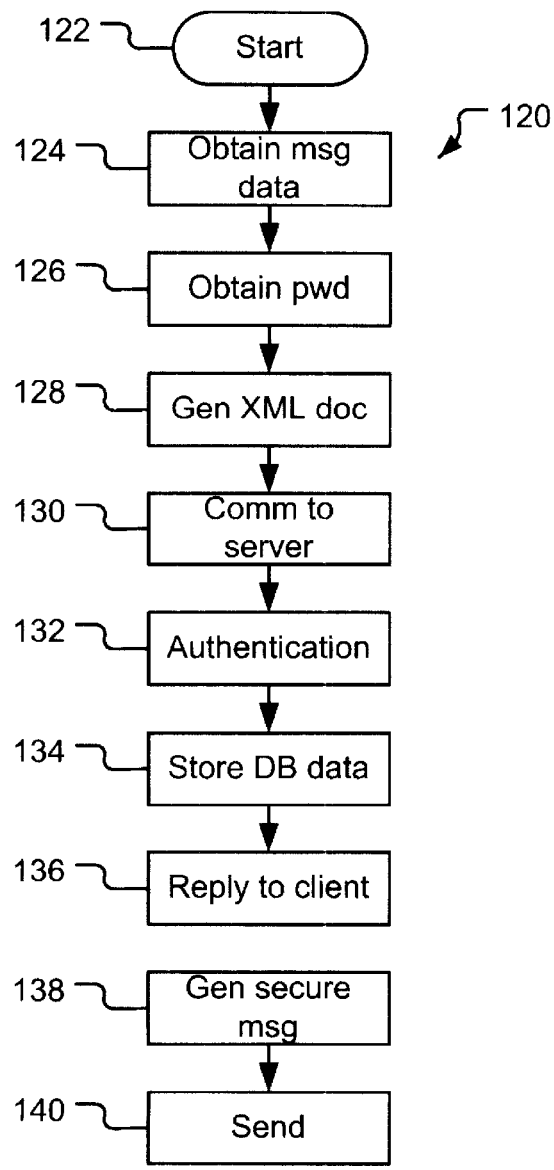
FIG. 7 is a flow chart depicting an encryption process that is usable in the embodiment of FIG. 1.

FIG. 7 is a flow chart depicting the presently preferred encryption process 120. At the time the sender 12 is ready to send a secure e-mail 14, an HTML send form 52b (FIG. 2b) is present with plaintext in the body field 60. It is assumed here that the sender 12 has already registered with the security server 24 and that an appropriate software module 26 has been installed into their browser. It is also assumed that the sender 12 is using only a browser to send the secure e-mail 14. The security aspects should be the same regardless of the actual mail client used, and this is used to keep the following explanation simple.

As described previously, the sender 12 selects the send securely button 64 on the send form 52b when they are ready to post. This constitutes a step 122, the start of the encryption process 120.

In a step 124, a script runs which passes the following information to the software module 26 in the sending unit 18:
the e-mail address of the sender 12 (emailAddress 103a);
the contents of the To, CC, and BCC: fields (instances of receiverAddr 106b);
the contents of the subject field 58; and
the contents of the body field 60.

In a step 126, if the software module 26 did not already know the password for the sender 12 it prompts for it. It is a matter of security policy choice whether to require the password to be entered on each send, since this could be unduly cumbersome in some cases. Caching the user's password, and thus also the password 102b, in the software module 26 may be insecure if the sender 12 leaves the browser session open. While the policy will often be to allow the sender 12 to choose how to configure this option, there will also be some cases, e.g., at public kiosks, where it should always be required that a password be entered for each secure e-mail 14.

In a step 128 the software module 26 creates an XML document in the following format, which will be the one encrypted:

```
<?xml version="1.0" encoding="ASCII"/>
<emailPart random="randomNum" length="numChars" mic="messageIntegritycode">
  <subject>subject</subject>
  <body>body</body>
</emailPart>.
```

Here the random element is an anti-cracking feature, it is a large random number used to ensure that even e-mails that are the same in content are not the same when secured; the length element is the number of characters in the body field 60; the mic element is a message integrity code created by taking a hash of the body field 60; the subject element is the contents of the subject field 58; and the body element is the contents of the body field 60.

In a step 130 the software module 26 opens an SSL HTTP (HTTPS) connection to the security server 24, and sends it the following information:
the emailAddress 103a of the sender 12;
the password 102b for the sender 12;
a list of target receivers 16 (receiverAddr 106b, and implicitly numRecipients 104d);
the subject field 58 of the message (subject 104i);
a list of computed hashes, one for the body, H(b), and one for each attachment, $H(a_1)$, $H(a_2)$ ... $H(a_n)$; and
optional configuration information such as an expiration time or maximum number of deliveries allowed per recipient.

In a step 132 the security server 24 proceeds depending on the result of an authentication sub-process.

1) If the emailAddress 103a for the sender 12 is unknown, the encryption process 120 can determine a known emailAddress 103a or stop. The emailAddress 103a might be unknown for various reasons. One common example will be that the sender 12 is new to the security server 24. In this case the software module 26 can be directed to open a separate browsing window which allows the sender 12 to register on the spot. Another reason that the emailAddress 103a can be unknown is due to a user error. One simple source of such errors can be that multiple users share the same browser. A sender 12 can then be requested to clarify their identity.

2) If the password 102b of the sender 12 is incorrect, the software module 26 can be instructed to prompt for the password 102b again (perhaps only a limited number of times), or let the sender 12 abort their sending operation (which returns them back to the original HTML send form 52b).

3) If the sender 12 is not allowed to send secure e-mails 14 the encryption process 120 can also stop. This can be for administrative reasons. For example, if the sender 12 has not paid a fee or if there is a court order preventing a user from using this encryption service, etc. The reason for a denial can then be stated in a dialog box that, when acknowledged, can return the user to the original HTML send form 52b (perhaps to instead use the send button 62, and to send the message as a conventional e-mail).

Otherwise, the sender 12 is considered to be authenticated and is allowed to send the presently contemplated secure e-mail 14, and this step 132 is successfully complete.

In a step 134 the security server 24 then creates and populates a record in the sentMail table 104. In particular, unique values are generated here for a messageId 104a (m), a messageKey 104e ($K_m$), and a list of computed seals (sList) for each part of the secure e-mail 14 being sent. The security server 24 computes the seals in sList as $H(H(H(x)+s+t+m+N_m)+N_m)$. The element s is userId 102a of the sender 12; t is the date and time (also stored as dateSent 104c in the sentMail table 104); m is the messageId 104a; $N_m$ is the sealSalt 104h (a random number generated for this particular secure e-mail 14, but separate from the messageKey 104e); and H(x) is from the set of hashes H(b), $H(a_1)$, $H(a_2)$ . . . $H(a_n)$ received from the software module 26. Note, the contents of sList need not be stored, since they should be re-computable.

In a step 136 the security server 24 responds back to the software module 26 of the sending unit 18 with an SSL packet of information in the form $\{m, K_m, sList\}_{SSL}$.

In a step 138 the software module 26 extracts the messageId 104a (m), the messageKey 104e ($K_m$), and the seals from sList, and proceeds to encrypt the above XML document and each attachment with the messageKey 104e. The software module 26 then destroys that key from memory in the sending unit 18. Specifically, the software module 26 creates a message form having the following general format:

----------BEGIN SECURECORP SECURED EMAIL----------
<securecorp:messagePart id="m">
<encrypted Part>encrypted body</encrypted Part>
<seal>seal</seal>
</securecorp:messagePart>
----------END SECURECORP SECURED EMAIL----------

If this part of the secure e-mail 14 includes an encrypted body, this is converted from a raw bit stream (post encryption) to an encoded stream so that the encrypted body element is composed of rows of printable (ASCII) characters. If this is an attachment, that is not necessary.

Finally, in a step 140 the software module 26 performs the same action as if the sender 12 had pressed the send button 62 in the send form 52b in the first place. It posts to the e-mail server 22 (perhaps via an e-mail capable web server, e.g., Yahoo!(™), Hotmail(™), etc.). The difference is that the value in the body field 60 of the form being posted is now encrypted and encoded as described above. Similarly, any attachments are encrypted as described above. From the point of view of a conventional e-mail server 22 or a web server, the result looks like a normal e-mail message whose body is just a bunch of gibberish. The secure e-mail 14 can then travel through the normal Internet mail system to arrive at its various destinations.

Attachments were not covered in much detail in the above discussion, but they can easily be handled as well. In the preferred embodiment attachments are each treated much like a body field 60, except that they are not wrapped in XML or encoded (turned into ASCII). Instead a binary header is added which includes protocol version information; a new length element, like that for the body; a copy of the same messageId 104a used for the body of the secure e-mail 14; a new mic element created by taking a hash of the attachment body; and a seal (as discussed for sList, above). The attachment is then encrypted using the same messageKey 104e as was used for the body of the secure e-mail 14 the header is added to it, and the result is uploaded to the e-mail server 22 in the usual manner.

This approach for attachments has a number of advantages. The database 100 of the security server 24 need not be disturbed by this approach to handling attachments, since the verification mechanism for them is thus carried within the secure e-mail 14 and is protected by the security features applicable there. This can also support any number of attachments. Each attachment is added to the object which will be passed into the software module 26 that does the encryption. Each attachment is encrypted using the same messageKey 104e as the body of a message, and the hash of each attachment can be computed using the same algorithm. By giving each attachment a full header it can be decrypted separately from any other attachment or even from the body. By separating the attachments it can also be determined if any particular attachment has been altered. The normal operations on the rest of a secure e-mail 14 can be performed even if the attachments are purposely not included, e.g., when replying to a secure e-mail 14 having attachments.

As noted above, the secure e-mail 14 travels through the normal e-mail system to the inbox of each receiver 16. The receivers 16 can typically go to a screen in their browsers where a summary of all messages that have been received is presented. By clicking on a message summary the browser can then deliver a page formatted with the message in it. This, however, requires that a suitable software module 26 is present.

Once a software module 26 is installed in the receiving unit 20 it is ready for use in message receive and read scenarios. A private label browser where the software module 26 is a plug-in variation 46a is also used in the following discussion, but those skilled in the art will here also readily recognize that the underlying principles are extendable to other systems using the secure e-mail system 10.

Returning briefly to FIG. 4, this also stylistically depicts the preferred approach for the software modules 26 to determine whether a secure e-mail 14 is being received. The software module 26 in the receiving unit 20 examines the stream 70 of pages 72 looking for any that contain a secure e-mail 14. The software module 26 can determine whether a page 72 contains a secure e-mail 14 by scanning for "----------BEGIN SECURECORP SECURED EMAIL----------" type tags. This can be done quickly, permitting minimal latency in delivering pages which should not be processed further. If an actual candidate page 72a is found it is removed from the stream 70, processed as now discussed, and replaced into the stream 70 as a processed page 72b, and thus made available for reading by the receiver 16.

Figure 8:
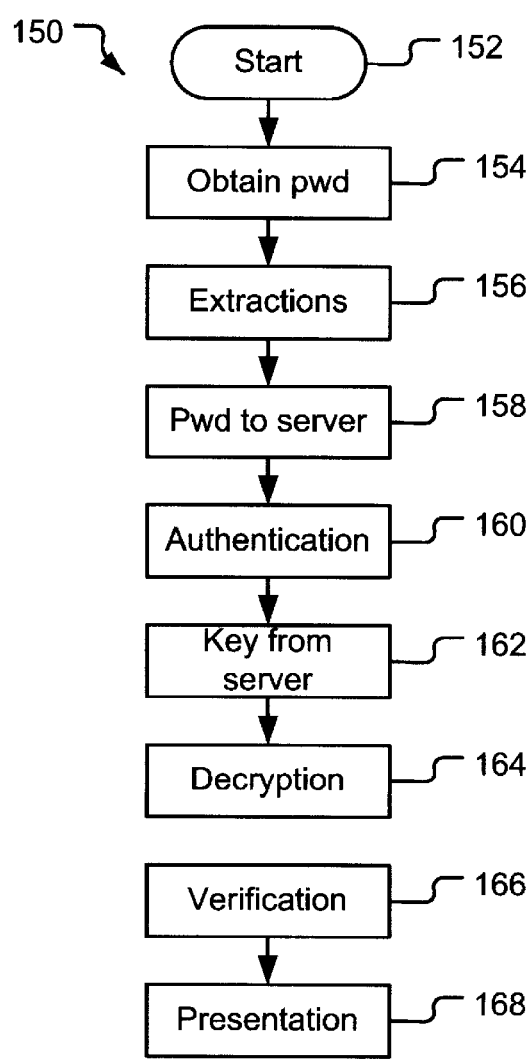
FIG. 8 is a flow chart depicting a decryption process usable in the embodiment of FIG. 1.

FIG. 8 is a flow chart depicting the presently preferred decryption process 150. It is here also assumed that the software module 26 has already been installed within a browser running on the receiving unit 20 of a receiver 16, and that the receiver 16 has registered with the security server 24 (the security server 24 perhaps having already generated an e-mail to any receivers 16 not previously registered). Once a secure e-mail 14 (i.e., a secured and sealed XML document created according to the encryption process 120) is selected by the receiver 16, the software module 26 performs the operations of decryption to permit reading of the secure e-mail 14 by its receiver 16. This constitutes a step 152, the start of the decryption process 150.

In a step 154 the password for the receiver 16 is obtained. Recall that both the senders 12 and the receivers 16 are treated as users by the security server 24, and both have equivalent entries in the users table 102 (FIG. 5). If the password 102b is not already cached, the receiver 16 is prompted to enter their password. The rules for password caching, prompting, etc. may be the same as for sending.

In a step 156 the software module 26 extracts the messageId 104a, decodes (if encoded) the received message and extracts the body field 60 (still encrypted).

In a step 158 the following information is then sent to the security server 24 (via SSL):the e-mail address of the receiver 16 (emailAddress 103a); the password 102b of the receiver 16; and the messageId 104a.

In a step 160 the security server 24 proceeds depending on the result of an authentication sub-process.

1) The security server 24 hashes the receiver's password with the salt 102c to determine the password 102b.

2) The password 102b is verified, based in part on association with the emailAddress 103a of the receiver 16. If this part of the authentication fails, the response to the software module 26 results in the receiver 16 being prompted for the correct password 102b or the decryption process 150 aborting.

3) It is determined whether the receiver 16 is authorized to read the present secure e-mail 14. For this, the e-mail address of the receiver 16 must match the receiverAddr 106b in the receivers table 106 for the particular messageId 106a, the numRequests 106d must be less than the maxDeliveries 104f for this secure e-mail 14, and the expiration 104g must not indicate that the message has already expired. If this authorization fails, the response to the software module 26 results in notifying the receiver 16 and then exiting the decryption process 150 without decrypting the secure e-mail 14.

Note, if either of these tests fail, the browser page can simply display as if it does not contain encrypted material, i.e., as unintelligible gibberish where the body field 60 would normally be. The sender id field 66, the various receiver id fields 56, and possibly also the subject field 58 (depending upon configuration) can still be intelligible, however. The receiver 16 may thus be able to contact the sender 12 or any other receivers 16 to determine if the secure e-mail 14 was important and if measures outside the secure e-mail system 10 are appropriate. If these tests are successful, the receiver 16 is considered to be authenticated and this step 160 is complete.

In a step 162 the security server 24 sends the messageKey 104e back to the software module 26 of the receiver 16 via SSL.

In a step 164 the software module 26 decrypts the secure e-mail 14, using this same messageKey 104e and the reverse of the basic process as was used to encrypt it.

In a step 166 the software module 26 validates the secure e-mail 14. This involves a second round of communications with the security server 24. The software module 26 generates new hashes of each part of the secure e-mail 14 and sends these and the seals included in each message part to the security server 24. The security server 24 then computes new seals, based on the passed in hashes, which it compares with the passed in seals. If there are any differences, this is an indication that the secure e-mail 14 is not authentic. The security server 24 then sends an indication about the authenticity of the secure e-mail 14 back to the software module 26.

Finally, in a step 168 an HTML receive form 54 is presented to the receiver 16 showing the plaintext body field 60 of the secure e-mail 14 where the encrypted message used to be. Further, if the indication about authenticity from the security server 24 was negative, the software module 26 presents a message advising the receiver 16 in this regard as well.

Also in the preferred embodiment, as an optimization of in the decryption process 150, the software module 26 caches the messageKey 104e so that the same message can be read again within the same session without accessing the security server 24. However, this is only for read operations and the messageKey 104e is never stored on disk.

Decryption of any attachment is simply performed using the same messageKey 104e and the same basic process. The only differences are that a binary header is used, as described earlier, and the information in an attachment is not encoded.

In summary, the software modules 26 of the preferred embodiment should: intercept and parse HTML pages before they are rendered; selectively modify HTML pages before they are rendered; extract data from HTML forms and pages; send data to a security server via a secure means (e.g., secure HTTP, SSL); perform symmetric key encryption and decryption using the same algorithm for both actions (e.g., Blowfish symmetric key encryption/decryption); perform hashing (e.g., secured hash algorithm one, SHA-1); display dialog boxes (for password entry, configuration, error messages, and seal verification results); and, preferably, be able to self-upgrade.

The security features underlying the preceding encryption process 120 and decryption process 150 bear some further analysis. For authentication purposes, the operator of the security server 24 knows the sender 12 because their email-Address 103a should associate with their password 102b. If the password 102b is treated the way it is supposed to be, i.e., only the holder should know it, then the operator of the security server 24 can be sure that only the sender 12 could have sent a particular secure e-mail 14. But the sender 12 does not necessarily even have to be trusted. By storing the sealSalt 104h initially, it is also possible for the operator of the security server 24 to be sure that no one, including the sender 12, can alter a secure e-mail 14 after it is sent. As an added security feature the sealSalt 104h may be stored encrypted in the database 100, and then never shared and never allowed to leave the security server 24. By encrypting the hashes of the body and attachments (H(b), H(a)) with the SSL key after the sender 12 has been authenticated (by providing the password 102b) it is possible to determine that it is the sender 12 who is signing their secure e-mail 14. Because the security server 24 stores only a hash of the actual password of the sender 12 as the password 102b, there is no way even the operator of the security server 24 can falsely sign a secure e-mail 14 on behalf of the sender 12.

Because the messageKey 104e is symmetric and because an outside entity is storing it, i.e., the security server 24, it is possible for someone to decrypt a secure e-mail 14 if they have intercepted both the secure e-mail 14 and also obtained its messageKey 104e, say, by breaking into the database 100. Interestingly, just having one or the other here does not do any good. This approach can be even further strengthened by encrypting the messageKey 104e with a public key. Then, breaking into the database 100 still does not help, since one would need the appropriate private key to be able to obtain the messageKey 104e needed to crack any given secure e-mail 14. A brute force attack on the database 100 therefore becomes infeasible. Also, to the extent possible, the operators of the security server 24 can put the necessary private key into actual hardware, making it virtually impossible to break into the database 100 without physical access to the actual machines being employed.

Reading a secure e-mail 14 is simpler than sending it. The only concern here is that there is a single key per message (messageKey 104e) used for decryption. Therefore there is a moment within the software module 26 where that key is in the clear on the receiver's machine and it is possible to access it. However, all that permits is reading the current secure e-mail 14 which the receiver 16 is allowed to read anyway. Hence, there is only a risk here if an unauthorized person can gain access to the key for the brief time that it is in memory. This would be extremely difficult, and it follows that, if the key could be stolen in this fashion, the decrypted message could just as easily (if not more so) also be stolen. So why bother with the key? In sum, this is not much, if any, of a security risk.

The use of the seal provides for nonrepudiation via the operator of the security server 24 acting as a trusted thirdparty notary. In particular, a judge can determine whether a message was actually sent from a sender 12 by giving the operator of the security server 24 the seal, the hash of the message and the name (to map to the userId 102*a*) of the sender 12. As was described for the preferred embodiment, a receiver 16 can verify that a seal is genuine (which proves that the sender 12 actually wrote and sent a particular secure e-mail 14), by sending the seal and a hash of the body of the received message to the security server 24. The security server 24 can then provide an assurance in this regard. The seal is used at the security server 24 to determine whether it is genuine by recomputing it based on the three known quantities. This technique is known as "nonrepudiation with secret keys" and is taught by Kaufman et al. in "Network Security: Private Communication in a Public World," Prentice-Hall, 1995, pp. 343-44.

Obviously, much of the security in the embodiments described here is also based on the strength of SSL. Currently, this seems to be an accepted standard, so we will not concern ourselves here with the fact that both the password 102*b* of the sender 12 and the messageKey 104*e* are sent over it. However, the strength of the security of the secure e-mail system 10 is not dependent on SSL. As more secure protocols for protecting a communications channel become available (e.g., Transport Layer Security or TLS), the secure e-mail system 10 can easily use such a protocol.

Up to this point the discussion has been primarily presentation of the secure e-mail system 10. The concept of a key server can, however, be used much more generally to build and deploy a variety of solutions that address the problem of secure communication. For example, this approach can also particularly facilitate enterprise instant messaging (EIM), video-conferencing, and secure real-time document editing. These are just additional examples of communication schemes employing message headers to deliver or route message content, and the a key server can be used with effectively any such communication scheme.

The solutions key servers provide are also particularly suitable for collaborative use by organizations. By using key servers, organizations can satisfy the most stringent security requirements while enabling their constituents to freely and easily collaborate via a rich set of techniques and media.

The following terms are used frequently throughout the rest of this document and are defined here for convenience:

Confidentiality protection—Ensuring that data can only be viewed by authorized recipients, irrespective of the data location (i.e., in transit or in storage).

Conversation key—A symmetric key that protects conversation data. Conversation data flows from a single source to one or more destinations.

Hub—The network server that processes messages and relays them to appropriate destinations.

Integrity protection—Ensuring detection of unauthorized modification to data in transit or in storage.

Join—To start participating in a collaboration.

Key server—A network server that holds protection keys and releases them to authorized users.

Leave—To stop participating in a collaboration.

Header key—A symmetric key that protects the header of a message. Header keys are individually established between the hub and each spoke.

Message—The basic unit of data exchanged between collaborating parties. A message has two parts, a "header" and "content." Message content—Data that is produced by a collaborating party and is destined for one or more other parties.

Message header—Data that helps the message router deliver the contents to its destinations.

Protection—Confidentiality and integrity protection.

Spoke—Senders or receivers of data; spokes do not relay data.

Transcript—A record of some part of the collaboration.

Figure 9:
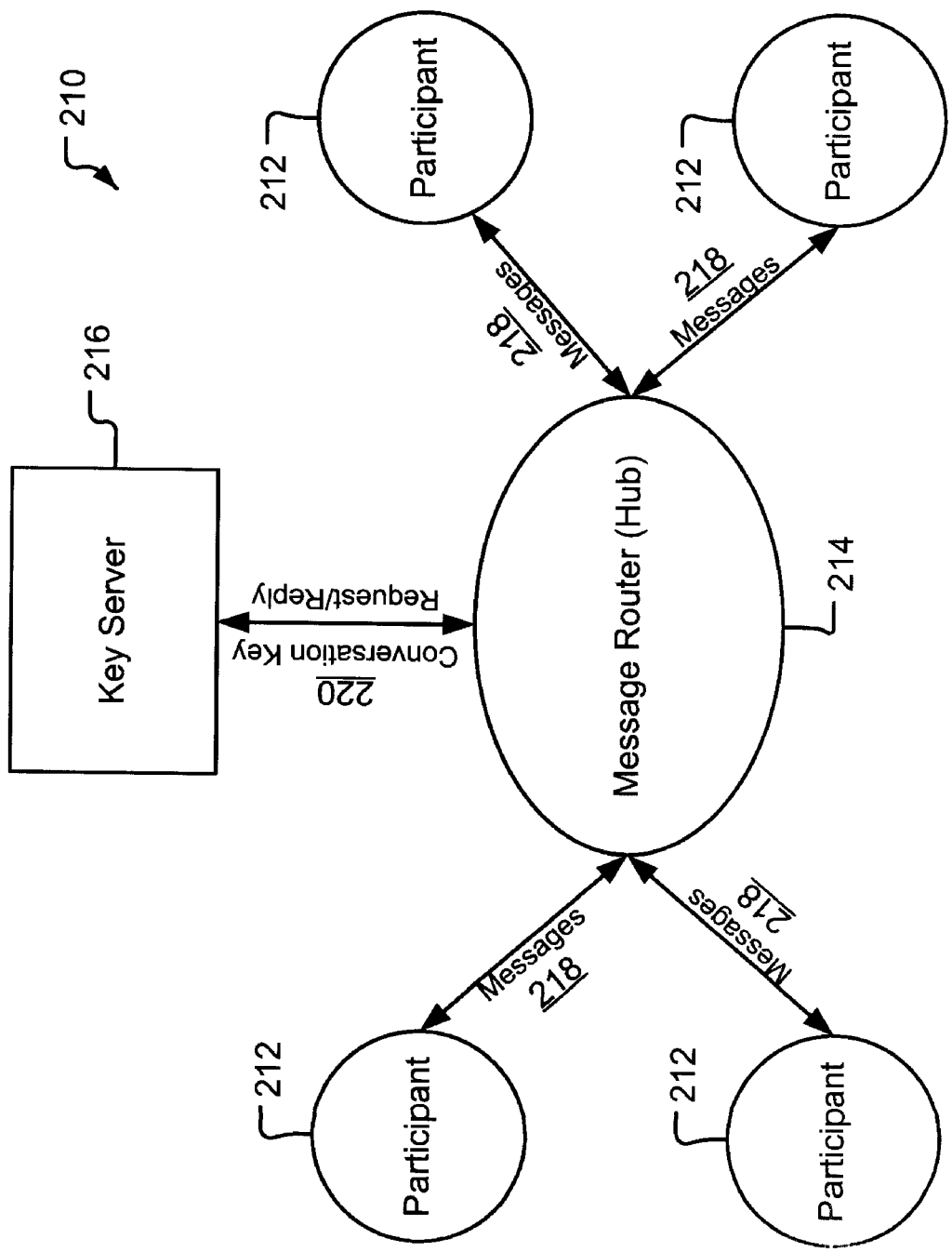
FIG. 9 is a schematic block diagram depicting the major components of a generic embodiment for secure collaboration and key exchange.

FIG. 9 is a schematic block diagram depicting the major components of a security server system 210. Although mostly generalized, this embodiment is particularly suitable for collaborative communication in an enterprise. The major components here include collaboration participants 212, one or more message routers 214, and one or more key servers 216. Accordingly, the collaboration participants 212 here are equivalent to the sending unit 18 and receiving units 20 in FIG. 1. The message router 214 is equivalent to the e-mail server 22 in FIG. 1 (or conventional routers). As described presently, however, the message routers 214 here may particularly be under the control of an enterprise using the security server system 210. The key server 216 in FIG. 9 is equivalent to the security server 24 in FIG. 1.

The collaboration participants 212 are the source (source participant 212*a*) and/or the destination (destination participant 212*b*) for the messages 218. As described presently, conversation keys 220 are used to protect the contents of the messages 218.

The message routers 214 deliver the messages 218 to the intended collaboration participants 212. Although the messages 218 may actually pass through multiple message routers 214, this is illustrated in the figures conceptually with just one message router 214 (or the e-mail server 22 and the possible routers through which a secure e-mail 14 might pass). When multiple message routers 214 are present, each "sees" the others much like it sees a collaboration participant 212. The collaboration participants 212 each maintain at least one persistent connection with the message router 214 (or the "closest" message router 214).

The key server 216 creates the conversation keys 220 or it can receive them from source participants 212*a*. The key server 216 then stores and releases the conversation keys 220 to the parties that are the collaboration participants 212 (presumably after authentication and authorization, but various schemes can be used for that and it is not a topic that is germane here). The key server 216 can also create or store conversation keys 220 in bulk, releasing an arbitrary number upon request. A client that is a server-class device (e.g., an email gateway) can thus get a bulk set of conversation keys 220 and protect each message 218 with a unique one, without needing to ask the key server 216 for a unique conversation key 220 every time.

To simplify the following discussion, encryption and decryption is used as the primary example of protection. Encryption/decryption with a key protects the confidentiality of a message. It should be appreciated, however, that this is only one possible example of protection. The integrity of a message can be protected using a keyed message digest (also known as Hashed Message Authentication Code, or HMAC), or both types of protection can be applied. For example, the key server 216 can create a 256-bit key and release it to a source participant 212*a*. The source participant 212*a* can then use the first 128 bits for encryption and the second 128 bits for HMACing.

Since the conversation keys 220 are used for encryption or hashing and later need to be retrieved for use in decryption or hash analysis, the key server 216 associates a unique ID with every conversation key 220. The unique ID, or something from which it can be derived, is then sent in the clear with each protected message 218. Thus, a collaboration participant 212 submits a request for a conversation key 220 to the key server 216 and the key server 216 responds with a reply back to the collaboration participant 212 containing the requested conversation key 220. The key server 216 is generic and can be used to manage the conversation key 220 for any type of application. The session between the collaboration participant 212 and the key server 216 thus is a secure session.

FIG. 1 and FIG. 9 differ in a major respect that illustrates an optional but highly useful feature. In FIG. 1 the e-mail server 22 and the security server 24 are depicted as having no direct communication. This scheme works well, for example, if the e-mail server 22 (or message hub used in its stead) is conventional. In contrast, in FIG. 9 the message router 214 and the key server 216 are depicted as having direct communication. This scheme works well if the message router 214 is designed to work in the security server system 210. The message router 214 can then be the entity that instructs the key server 216 to create new conversation keys 220 when a collaboration participant joins or leaves a conversation.

Figure 10:
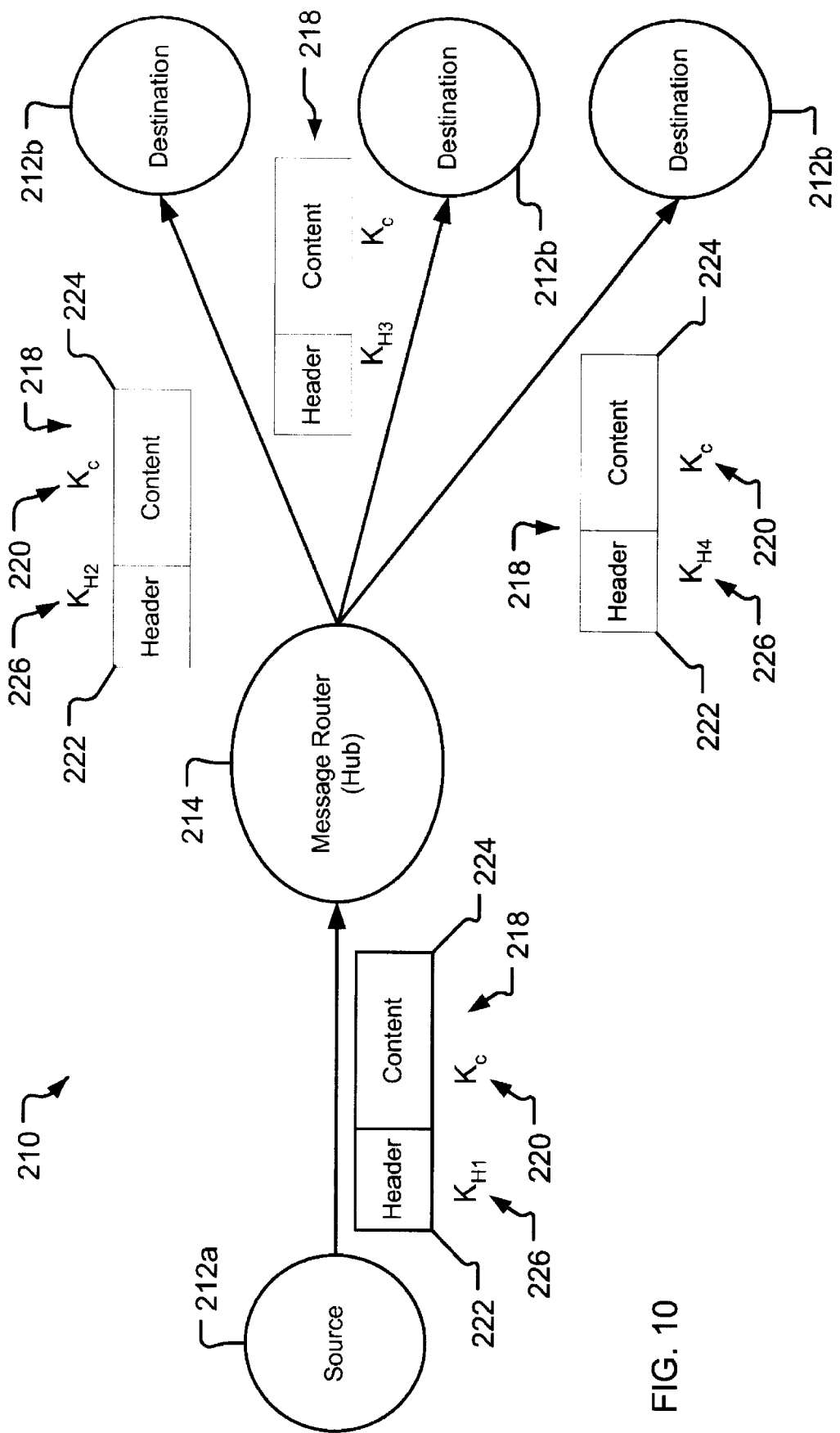
FIG. 10 is a schematic block diagram depicting the typical flow of a message in the generic form in FIG. 9.

FIG. 10 is a schematic block diagram depicting the typical flow of a message 218 in the security server system 210. The message 218 includes a message header 222 and a message content 224.

The message header 222 includes data that helps the message router 214 deliver the message 218 to its destinations, i.e., one or more destination participant 212b. Some examples of elements in the message header 222 are:

To—The destinations of the message.
From—The origin of the message.
Date—The date and time of message creation.
Message ID—A unique identification for the message.
Content length—The length of the content.
Content type—The MIME type of the content.
Priority—The priority of the message.

The message content 224 includes data that is produced by a source participant 212a and destined to one or more destination participants 212b. Of course, the collaboration participants 212 can and often do change roles as source participant 212a and destination participant 212b if multiple messages 218 are exchanged during the course of a collaboration. The message routers 214 do not inspect the message content 224. [Special services such as content filtering and virus scanning can examine the message content before forwarding it to its destinations. However, this is an optional service and is independent of message routing.]

FIG. 10 also shows how the depicted embodiment of the security server system 210 actually uses two types of keys for protecting data. Again with protection being with respect to confidentiality, integrity, or both. Firstly, the message router 214 establishes a header key 226 with each collaboration participant 212. The header key 226 protects the message header 222 of a message 218. Every connection between a message router 214 and a collaboration participant 212 uses a different header key 226. The key server 216 does not create, store, or manage the header keys 226. Moreover, the header keys 226 are ephemeral and do not last beyond the life of the session between the message router 214 and the collaboration participant 212. Secondly, a conversation key 220 protects the content of a message 218. It is possible for any process (collaboration participant 212 or message router 214) to create (request and be granted) a conversation key 220. Using this two key approach enables efficient, yet highly secure distribution of messages 218 from their source to their destinations.

This use of two keys is also different than the scheme depicted in FIG. 1, where only one key equivalent to the a conversation key 220 is used. The use of the header key 226 is optional, but adds additional security. An enterprise that controls the message router 214, for instance, may wish to impose this added level of security and keep even the information in the message header 222 secure.

The message router 214 only needs to process the message header 222 of a message 218 to perform its tasks. In FIG. 10, it uses the header keys 226 ($K_{H1}$, $K_{H2}$, $K_{H3}$, or $K_{H4}$), depending on the collaboration participant 212 with which it communicates. The message content 224 of the message 218 simply flows through the message router 214 unmodified, and the destination participants 212b then request and use the same conversation key 220 ($K_C$) to decrypt and to verify the integrity of the message content 224 of the message 218. Separating the header key 226 from the conversation key 220 in this manner is advantageous in that each message router 214 can "stream" messages 218 to the next, without needing to verify the integrity of the entire message content 224. This is in contrast to SSL and IPSec, that must artificially break messages into manageable blocks and encrypt each block individually.

In order to provide forward and backward secrecy, the message router 214 can change or "roll over" the conversation key 220 when any of the following events occur. When a new collaboration participant 212 joins a conversation, the message router 214 can see that the conversation key 220 is changed. All of the messages 218 communicated prior to this event remain encrypted using the old conversation key 220 and, by default, are not made available to the new collaboration participant 212. Similarly, when an existing collaboration participant 212 leaves the conversation (e.g., disconnects from the message router 214), all of the messages 218 communicated subsequent to this event are encrypted using a new conversation key 220. This new conversation key 220 is not, by default, available to the departing collaboration participant 212. Under the preferred embodiment of the security server system 210, transcripts remain encrypted while in storage. Therefore, depending on the sequence of events during a collaboration (i.e., join and leave operations), there may be multiple conversation keys 220 that encrypt different parts of a conversation.

The conversation key 220 roll over process can be optimized, say, when there may be large numbers of collaboration participants 212, in keeping with the enterprise collaboration theme of this embodiment in FIGS. 9 and 10. Even though the message router 214 generally should not be able to access the actual (encrypted) message content 224, it can determine when the message content 224 is substantive. For example, information in the message header 222 may indicate this or the message content 224 may be absent. With this information the message router 214 can defer rolling over the conversation key 220 until the next substantive message 218 is encountered. Thus, multiple collaboration participants 212 may join a new conversation and the conversation key 220 is not automatically rolled over as each joins. Instead, the conversation key 220 is rolled over when a substantive message 218 is sent. Similarly, multiple collaboration participants 212 may leave an existing conversation and the conversation key 220 is not rolled over until the next substantive message 218 is sent.

The following discussion summarizes, without limitation, some of the novel ideas the security server system 210 implements. It can assign and use a single conversation key 220 to protect data throughout its life. By use of this single conversation key 220, the message router 214 need not decrypt and re-encrypt the messages 218. This enables highly efficient routing of the messages 218 and permits scalable, enterprise-class collaboration systems.

In contrast, existing technologies use multiple keys for protecting data (with respect to confidentiality and integrity) as it is transmitted from its origin to multiple destinations. Typical implementations employ the secure socket layer/transport layer security (SSL/TLS) or IPSEC protocols. Using SSL/TLS every message must be encrypted at its origin, decrypted at the server that routes it (i.e., the hub), re-encrypted again at the hub, and finally decrypted at the final destination.

The security server system 210 can also easily maintain forward and backward secrecy. When a new collaboration participant 212 joins or when an existing collaboration participant 212 leaves a collaboration, the conversation key 220 can be changed. This assures all the collaboration participants 212 that new users do not have access to any part of the collaboration data prior to joining and, similarly, that users who have left the conversation do not have access to the collaboration data after leaving. Even if an attacker can remain connected to the security server system 210 and receive messages 218, the conversation key 220 to decrypt that message content 224 of those messages 218 will not be available to them.

In contrast, existing technologies rely on the state of the connection to maintain secrecy. That is, a user who is not connected to the hub cannot receive collaboration data. While this works for unsophisticated users, it is not a secure technique for protecting collaboration data from more sophisticated attackers.

The security server system 210 also permits efficient multi-user participation. It minimizes the number of encryptions and decryptions at the message router 214 by not performing encryptions or decryptions with the conversation key 220 at the message router 214. In fact, the number of encryptions and decryptions applied to the collaboration data at the message router 214 is independent of the number of collaboration participants 212.

In contrast, existing technologies degrade in performance when the number of users increases. There are many factors that contribute to such performance degradation, but a major one is the number of protection operations performed at each component of the system. Existing technologies use a session key for protecting the collaboration data. This is inefficient because the number of sessions is proportional to the number of users, and the number of required protection operations increases with the number of users.

The security server system 210 also permits multiple, secure threads in the same collaboration or session. This is because collaboration data (message content 224) is protected using the conversation key 220 rather than a session key. Thus, a session may use multiple conversation keys 220 depending on the set of authorized collaboration participants 212.

Existing technologies use a session key to protect the collaboration data. Protection of multiple threads of conversations within the same collaboration therefore requires multiple sessions. This in turn results in rigid and inefficient systems.

The security server system 210 also handles transcripts more elegantly. It uses the same set of conversation keys 220 for protecting the message content 224 during and after the collaboration. This results in more flexible, yet highly secure collaboration systems.

Technologies that use session keys have rigid techniques for protecting a transcript of the collaboration data, because session keys are ephemeral and do not last beyond the end of a collaboration.

The security server system 210 also improves on other existing security technologies as now described. A collaboration technology that uses public key infrastructure (PKI) for all of its security function results in inefficient and rigid systems. Protecting collaboration data using PKI requires all participants to have PKI digital certificates. In contrast, the security server system 210 can use PKI certificates to authenticate any collaboration participant 212. However, owning a PKI certificate is not required. Thus, collaboration participants 212 who can prove their authenticity at a sufficiently strong level can engage in the collaboration.

A collaboration technology that is based on IPSec must use individual Security Associations (SA). First, an SA is ephemeral and SA keys can practically only protect collaboration data while in transit. Second, an SA is specific to a source/destination pair. Therefore, collaboration applications (e.g., Instant Messaging) that work based on a hub-and-spoke model require protection of data as information travels through multiple SAs. In contrast, the security server system 210 can protect collaboration data (message content 224) while in transit and in storage using the same base technology.

A collaboration technology that uses SSL/TLS requires multiple SSL/TLS sessions. First, a session is ephemeral and session keys can practically only protect the collaboration data while in transit. Second, a session is specific to a client/server pair. Therefore, collaboration applications (e.g., Instant Messaging) that work based on a hub-and-spoke model will require protection of data as information travels through multiple sessions. In contrast, the security server system 210 can protect collaboration data while in transit and in storage (i.e., a transcript) using the same base technology.

Figure 11:
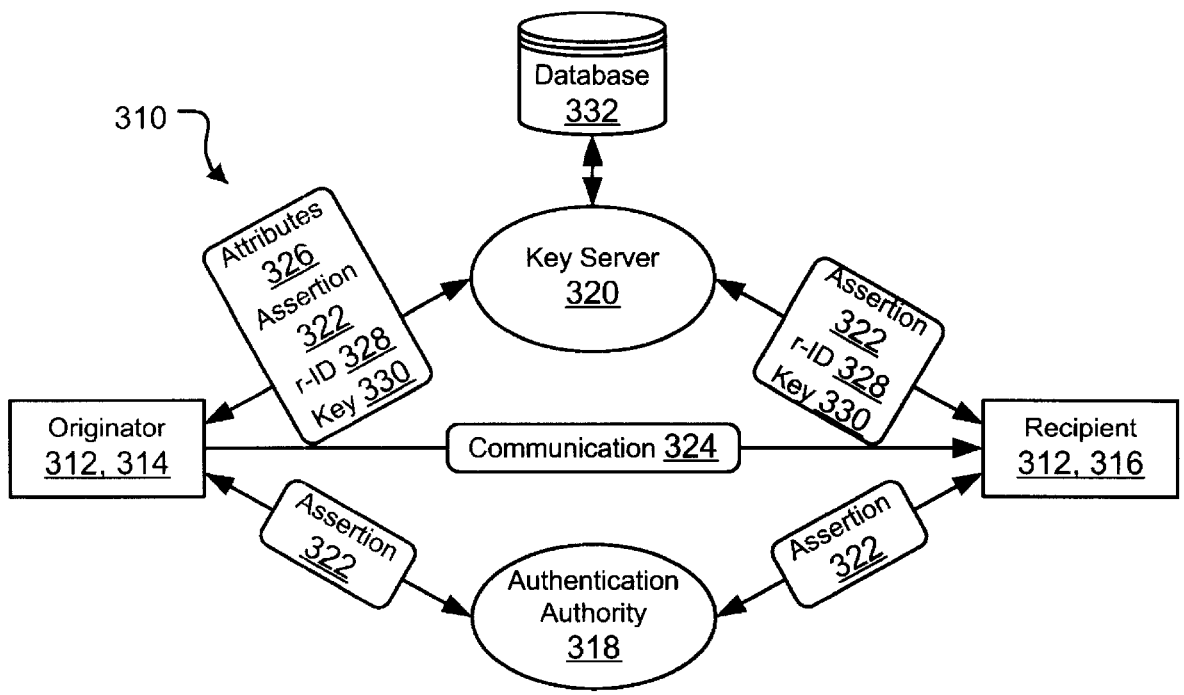
FIG. 11 is a block diagram depicting a communication system able to determine process events that may use four basic components.

FIG. 11 is a block diagram depicting how a communication system 310 can consists of four basic components: a communicating party 312 (an originator 314 or a recipient 316), an authentication authority 318, and a key server 320.

Typically, both the originator 314 and the recipient 316 will contact the authentication authority 318 and authenticate themselves. However, the authentication authority 318 for the originator 314 may or may not be the same as the authentication authority 318 for the recipient 316. The communicating party 312 uses a protocol that is specific to the authentication authority 318 (e.g., user ID and password over TLS, two factor authentication, challenge/response protocol using PKI certificates, etc.). As a result of successful authentication, the authentication authority 318 issues the communicating party 312 an authentication assertion 322. The authentication authority 318 signs this assertion 322 (typically, using a PKI private key). Every assertion 322 is different.

Subsequently, the originator 314 has data for a communication 324 that it wants to sent to one or more recipients 316. The originator 314 then contacts the key server 320 and provides it with its assertion 322 and with attributes 326 for the intended communication 324. The attributes 326 are described in more detail below, but include a list of the intended recipients 316 for the communication 324.

The key server 320 confirms the assertion 322 from the originator 314. Then it assigns a resource ID 328 to the prospective communication 324, creates a key 330 suitable to encrypt the communication 324, and provides the resource ID 328 and the key 330 back to the originator 314.

Optionally, the originator 314 can instead send the key 330 to the key server 320 and ask it to associate that key 330 with a resource ID 328. In the course of all this, the key server 320 records the resource ID 328, the key 330, the assertion 322, and the attributes 326 in a database 332 that it maintains.

The originator 314 next constructs the communication 324, by encrypting the data using the key 330 and adding the resource ID 328 in the clear. The originator 314 then transmits the communication 324 to all of the recipients 316 using conventional means. Note, the originator 314 need not, and in most embodiments will not, ever send the communication 324 to either the key server 320 or the authentication authority 318.

Each recipient 316 must retrieve a key 330 from the key server 320 that is suitable for decrypting the encrypted communication 324. Since the communication 324 includes the resource ID 328 in the clear, the recipient 316 provides its assertion 322 and the resource ID 328 to the key server 320. The key server 320 then confirms the assertion 322 from the recipient 316. It also checks that the recipient 316 is an intended one for the communication 324 that the resource ID 328 specifies, using the list of intended recipients 316 that the originator 314 previously provided in the attributes 326. If the attributes 326 also included other criteria, described presently, for making a key 330 available, the key server 320 also checks that those criteria are met. Then the key server 320 provides the key 330 to the recipient 316.

Finally, the recipient 316 decrypts the communication 324 with the key 330. Coincidental with this, the integrity of the content of the communication 324 is validated by whether decryption is successful and, optionally, by comparing a cryptographic checksum that has been included in the communication 324. Such a checksum can be in the clear part of the communication 324, along with the resource ID 328, but more typically will be included in the encrypted part along with the content of the communication 324. Such a checksum can also encompass different parts of the overall communication 324. For instance, it may be derived from only the content part of the communication 324, or it may be derived from other parts of the communication 324. An example when the communication 324 is in email form might be to include the subject and the encryption time in the checksum. In this manner, the recipient 316 can tell if a subject portion sent in the clear has been altered or if the communication 324 has been unduly delayed.

TABLE 1 shows a schema for the content of the database 332 maintained by the key server 320. The ResourceID field is straightforward, it is the resource ID 328 we have already discussed. The ResourceType field provides the scope of the application type for which the key 330 is created. For example, Email and Instant Messaging could use different resource types. This will relieve different applications from needing to coordinate resource ID 328 uniqueness. The combination of the ResourceID and ResourceType fields is always unique. The ResourceKey is simply the key 330, also already discussed. Only one ResourceKey is needed if the key 330 is a symmetric key, i.e., the same key 330 is used by both the originator 314 and the recipient 316. Embodiments of the communication system 310 may also use asymmetric keys. In this case, if the key server 320 provides the encryption key 330 to the originator 314, it will have a ResourceEncryptKey field for that as well as a ResourceDecryptKey field to store the decryption key 330 that should be provided to the recipient 316. If the originator 314 handles key generation, it may send both the encryption and decryption keys 330 to the key server 320, or just the decryption key 330.

Continuing with the schema, the KeySize field is optional. One size key may be used exclusively, but there is no limitation that this be the case. Some users may want the very strong encryption that a bigger key can provide, while others may want the reduced processing burden that a smaller key can provide. Another consideration is that keys have tended to become bigger as cracking resources have become more powerful. This trend will likely continue, and embodiments may thus need to handle different key sizes just to deal with legacy key size and upgrade key size issues.

The KeyCreator field may also be optional. Embodiments are possible where only the key server 320 creates the keys 330, or where the originators 314 always create the keys 330. Having this field permits either of these, or a mixed arrangement where the keys 330 are sometimes created by the key server 320 and other times created by the originators 314. Having such capability present in an embodiment, of course, does not limit policies being used to specify which arrangement is used or to specify arrangements that must be used for particular originators 314.

It is anticipated that the KeyOwner field will be present in the vast majority of embodiments. The originators 314 are the "owners" of the keys 330 and one use of this field is to facilitate the key server 320 changing the contents of the schema in useful ways. For example, in a corporate context an originator 314 may want to prevent a key 330 from being released to a recipient 316 who has just now been discharged. Alternately, an originator 314 may want to now permit release of the key 330 for a longer period of time than that initially specified, say, because the originator 314 has discovered that the recipient 316 is on vacation. The KeyOwner field also permits the key server 320 to respond to requests from other parties, but presumably only when appropriate. For instance, a government agency may request the key server 320 to freeze all keys 330 already issued to a particular originator 314 and to not issue additional ones. Or a court may order the release of a key 330 to decrypt a communication 324 to check for evidence of a conspiracy between an originator 314 and a recipient 316.

Intentionally not having or having and simply not using the KeyOwner field is still possible. A key server 320 might provide keys 330 to "anonymous" originators 314, and even to "anonymous" recipients 316. In a simplest form of this, a key server 320 could provide a key 330 and a resource ID 328 when any originator 314 simply asks; and the key server 320 can then provide that key 330 (or a corresponding one if asymmetric encryption is used) to any recipient 316 who simply asks and provides the resource ID 328. Alternately, an anonymous originator 314 could specify an intended recipient 316, so that the key server 320 would only release the key 330 to that non-anonymous recipient 316. A key server 320 also might or might not require an assertion 322 from either or both of the originator 314 and the recipient 316. For instance, the key server 320 might provide or release a key 330 to a communicating party 312 merely on the strength of having been provided a valid assertion 322.

Continuing again with the schema, the DateCreated field is theoretically optional, but has clear uses and typically will be provided and used. The rest of the fields in the schema are ones set in response to the attributes provided by the originator 314, and should be clear from the description in TABLE 1 and the following discussion of how these relate to events.

The communication system 310 enables the construction of three sets of business events. Controlling events 340 (FIG. 12) consist of a set of actions taken by an originator 314 to control when and how many times a recipient 316 can view a communication 324. Positive events 342 (FIG. 13) consist of a set of actions taken by a recipient 316. And negative events 344 (FIG. 14) consist of a set of actions that were expected from a recipient 316 but have not yet been initiated.

The key server 320 sets the controlling events 340 based on the attributes 326 provided by originators 314. The key server 320 can then determine both the positive events 342 and the negative events 344 based on the information in its database 332 and its communications or lack thereof with the recipients 316.

Recall that in order for the recipients 316 to view the communication 324 they authenticate and retrieve the decryption key 330 from the key server 320. The originator 314 of the communication 324 is the "owner" of this key 330 and can set the attributes 326 to create the controlling events 340 for when, and how many times each recipient 316 can retrieve the decryption key 330. The attributes that enable this functionality are the fields ReleaseAfter, ExpireOn, and NumReleases in the database 332 that the key server 320 maintains.

Figure 12:
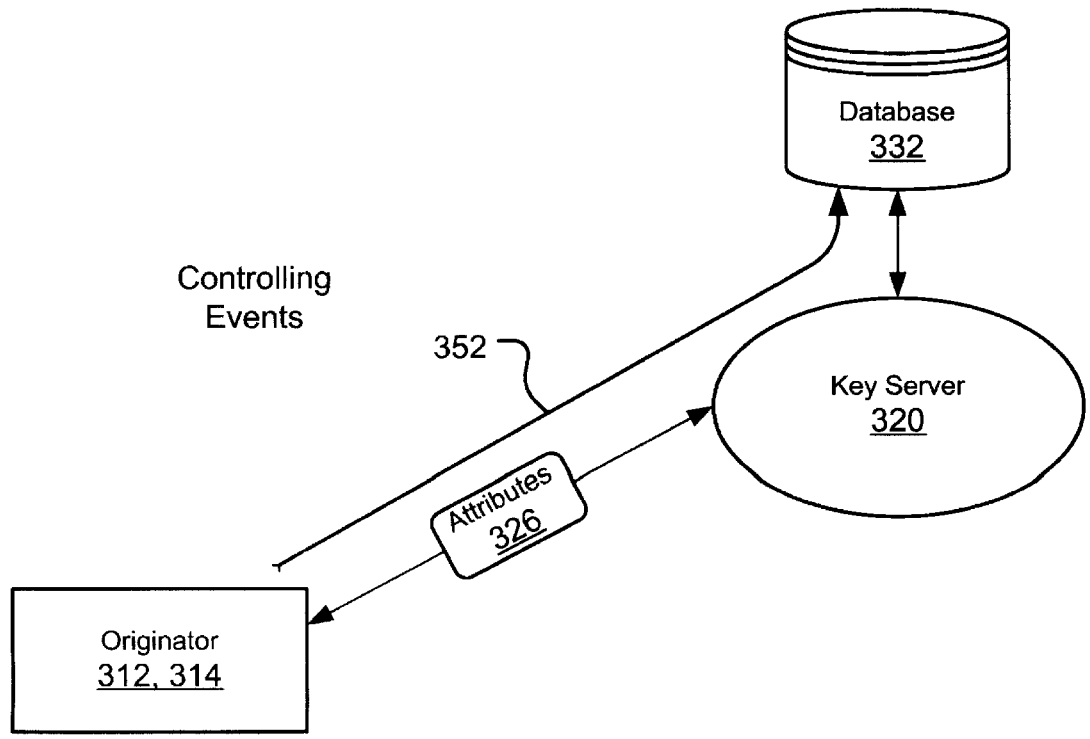
FIG. 12 is a block diagram showing the flow of information related to controlling events.

FIG. 12 is a block diagram showing the flow of information related to the controlling events 340. An arrowed line 352 shows how the attributes 326 flow from the originator 314 to the key server 320 and into its database 332.

Figure 13:
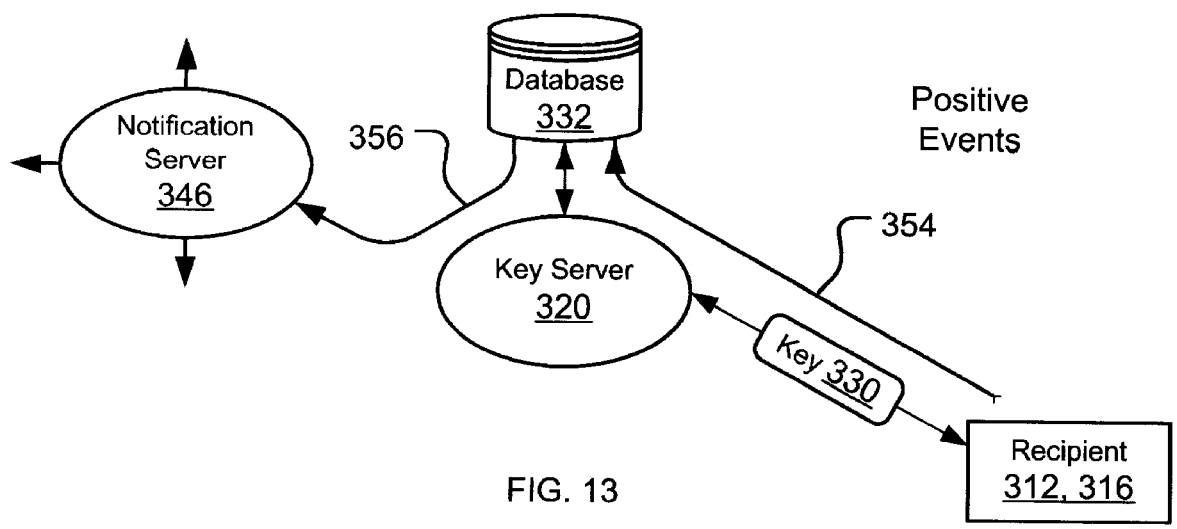
FIG. 13 is a block diagram showing the flow of information related to positive events.

FIG. 13 is a block diagram showing the flow of information related to the positive events 342. An arrowed line 354 shows how a request for the key 330 (including the ResourceID and the recipient's assertion 322) flows from the recipient 316 to the key server 320 and information about this flows into the database 332 of the key server 320. The key server 320 records when, and how many times a given recipient 316 retrieves the key 330. This serves as the underpinning for creating the positive events 342 that signal the actions taken by a specific recipient 316 at a specific time. The attributes that enable this functionality are the fields LastReleased and NumReleased in the database 332 of the key server 320.

Another arrowed line 356 shows how the key server 320 can signal a notification server 346 (shown separate from the key server 320, but not necessarily so) when a recipient 316 retrieves the decryption key 330. The notification server 346 can then signal a follow up action, depicted by multiple arrowed line 358 going to multiple possible destinations. For example, the notification server 346 can notify a system in a marketing department, which in turn alerts a marketing representative to call the prospect (recipient 316) and follow up.

Figure 14:
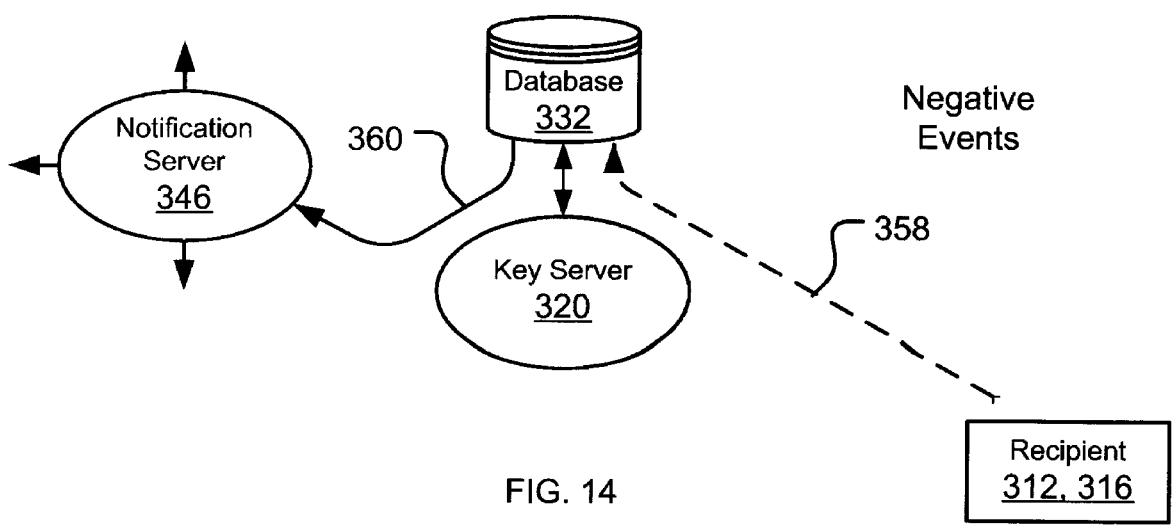
FIG. 14 is a block diagram showing the flow of information related to negative events.

FIG. 14 is a block diagram showing the flow of information related to the negative events 344. Signaling the negative events 344 uses the attributes in the fields LastReleased and ExpectedRequest in the database 332 of the key server 320. A phantom arrowed line 360 (dashed) here shows the flow of information from the recipient 316 to the key server 320 that has not occurred, and the arrowed line 356 and the multiple arrowed line 358 again show the flow of information from the key server 320 to the notification server 346 that occurs due to this. If a recipient 316 fails to request the key 330 by a given time, then the key server 320 sends a signal to the notification server 346, and the notification server 346 can then signal a follow up action. For example, the notification server 346 can notify a system in a customer call center, which in turn alerts a customer service representative to call the customer (recipient 316) and verbally communicate the content of the communication 324.

Figure 15:
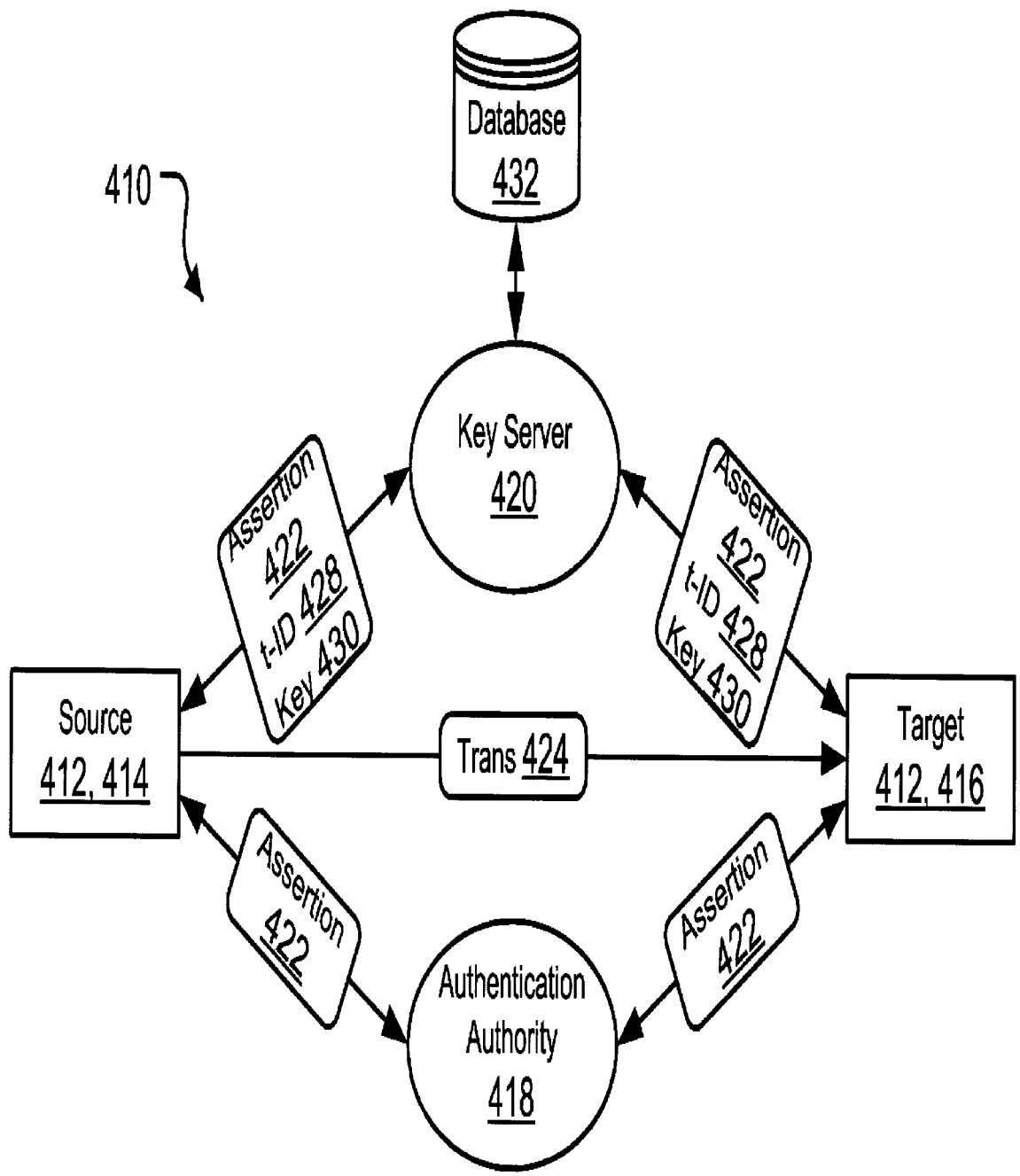
FIG. 15 is a block diagram depicting how an embodiment of the present inventive communication system may use four basic components.

FIG. 15 is a block diagram depicting how an embodiment of the present inventive communication system 410 may use four basic components: a transacting party 412 (a source 414 or a target 416), an authentication authority 418, and a key server 420.

The transacting party 412 communicates with the authentication authority 418 to authenticate itself. The transacting party 412 uses a protocol that is specific to the authentication authority 418 (e.g., user ID and password over Transport Layer Security, two factor authentication, challenge/response protocol using PKI certificates, etc.). As a result of successful authentication, the authentication authority 418 issues the transacting party 412 an authentication assertion 422. The authentication authority 418 signs this assertion 422 (typically, using a PKI private key). The assertion 422 includes the identity of the transacting party 412; the identity of the authentication authority 418; the validity period of the authentication assertion 422; and optional confirmation data, used by the key server 420 to prove that the transacting party 412 is the rightful owner of the assertion 422. One example of such confirmation data may be a temporary public key whose private key is known to the transacting party 412. The transacting party 412 may create this private key and, via the authentication protocol, ask the authentication authority 418 to assert that the corresponding public key belongs to the transacting party 412. Alternatively, the authentication authority 418 can create the key pair, securely deliver the private key to the transacting party 412, and assert that the corresponding public key belongs to the transacting party 412. The former method is generally preferable because the authentication authority 418 will then not have knowledge of the private key.

As mentioned before, the source 414 authenticates with the authentication authority 418 and receives an assertion 422. Subsequently, typically just before when the source 414 wishes to communicate a transaction 424 to one or more of the targets 416, the source 414 communicates with the key server 420. The key server 420 assigns a transaction ID 428 to the transaction 424 and creates an encryption key 430 for the transaction 424. (The encryption key 430 may or may not be the same key 430 that is usable for decryption.) Optionally, the source 414 can send the key 430 to the key server 420 and ask it to associate the key 430 with the transaction 424. The key server 420 records the key 430, the transaction ID 428 and the assertion 422 of the source 414 all in a database 432 which the key server 420 maintains. Finally, the source 414 protects the confidentiality and integrity of the data in the transaction 424 using the key 430 and transmits the transaction 424 to the target 416. This transmission may be via entirely conventional means, not traveling via either of the authentication authority 418 or the key server 420.

The communication system 410 achieves nonrepudiation of origin by associating the assertion 422 of the source 414 with the transaction ID 428 and the key 430 that protects the transaction 424. The key 430 thus "cryptographically" binds the transaction 424 and the source 414. For example, in an embodiment where the transaction 424 is embodied in an email, the communication system 410 can be used to prove that the source 414 originated the email and was authenticated via a specific authentication method at a specific authentication authority 418.

If the source 414 later attempts to repudiate the transaction 424, a party seeking to contest this can proceed in various ways. If the party is the target 416, this can be as simple as providing the transaction ID 428 and the identity of the putative source 414 to the key server 420 and asking it for confirmation that the putative source 414 provided the assertion 422 associated with the transaction ID 428. Alternately, the target 416 can provide just the transaction ID 428 and ask the key server 420 who the source 414 was that received the transaction ID 428.

Of course, the source 420 or others may still not be willing to simply concede that the target 416 has adequately confirmed the origin of the transaction 424. However, the party resolving matters can also be one other than a transacting party 412 (source 414 or target 416), say, an arbitrator, a court, or a bank. The party here can then provide the transaction ID 428 to the key server 420 and be advised who the source 414 is that provided the assertion 422 that resulted in issuance of that transaction ID 428 and what the key 430 is that should decrypt the transaction 424 and verify its integrity. If that key 430 does decrypt the transaction 424 and verifies its integrity, the question of origin is settled. Alternately, possibly even more typically, the party can provide both the transaction 424 and the transaction ID 428 to the key server 420, the key server 420 can determine if the key 430 it has decrypts the transaction 424 and verifies its integrity, and the key server 420 can then advise accordingly. Note, here also the identity of the putative source 414 can be provided to the key server 420 and it can confirm (i.e., provide a yes or no answer) whether the putative source 414 provided the assertion 422 associated with the transaction ID 428.

As also mentioned before, the transaction target 416 also authenticates with an authentication authority 418 (not necessarily the same one used by the source 414, however) and also receives an assertion 422. The target 416 then must retrieve a decryption key 330 from the key server 420 in order to decipher the data in the transaction 424 and validate its integrity. Prior to releasing the key 330 for this, the key server 420 records the assertion 422 of the target 416 and also associates it with the transaction ID 428.

The communication system 410 thus achieves nonrepudiation of receipt by associating the assertion 422 of the target 416 with the transaction ID 428 and the key 330 that protected the transaction 424. For example, in an embodiment where the transaction 424 is embodied in an email, the communication system 410 can be used to prove that the target 416 received and opened the email and was authenticated via a specific authentication method at a specific authentication authority 418.

If the target 416 later attempts to repudiate receipt of the transaction 424, matters can be simply determined by providing the transaction ID 428 and the identity of the target 416 to the key server 420 and asking it for confirmation that the target 416 requested the key 430, that the target 416 proffered a valid assertion 422 as part of its request, and that the target 416 was only then provided the key 430. This leaves only the question of whether the target 416 in fact used the key 430 to open the transaction 424. As described above, however, the requests by transacting parties 412 will typically be handled by software (e.g., software modules 26, FIG. 3). Thus, for at least the targets 416, receiving the key 430 and using it can easily be made automatic and essentially contemporaneous. This provides a very difficult to overcome presumption that targets 416 who have received keys 430 have also used them to open transactions 424.

The key server 420 can permanently record the assertions 422 of the source 414 and all of the targets 416 in its database 432. Since the communication system 410 associates these assertions 422 with the transaction ID 428, the database 432 can be used to reconstruct the events of originating the transaction 424 and each receipt of the transaction 424. This serves as the basis of a comprehensive audit system.

Figure 16:
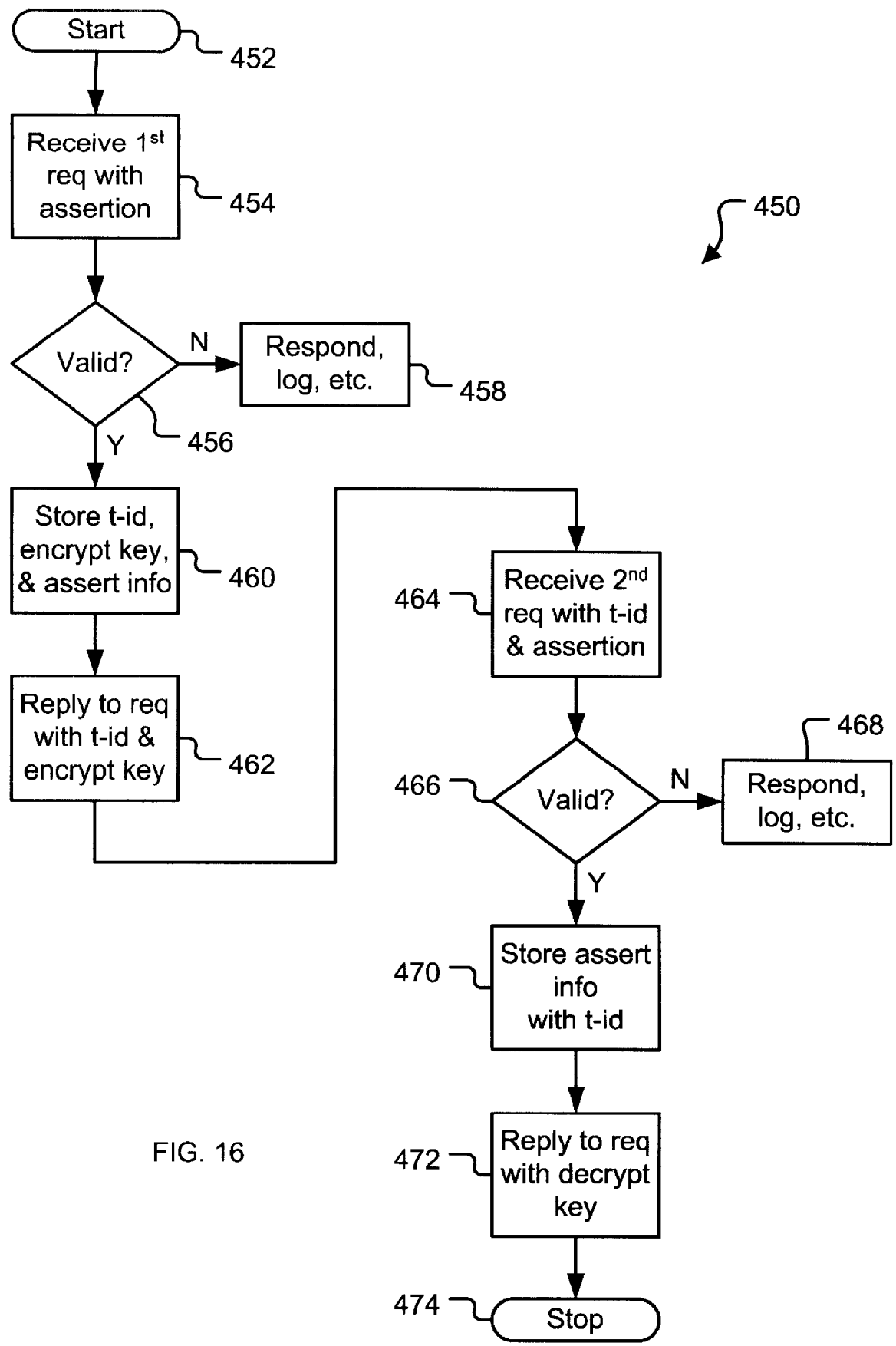
FIG. 16 is a flow chart depicting a suitable process by which the communication system can establish data in a database for later nonrepudiation and audit purposes.

FIG. 16 is a flow chart depicting a suitable process 450 by which the communication system 410 can establish data in the database 432 for later nonrepudiation and audit purposes. The process 450 starts in a step 452, wherein the existence of the authentication authority 418 and key server 420 is presumed and the source 414 has already obtained an assertion 422 from the authentication authority 418.

In a step 454, a request is sent to the key server 420. It is expected that in most embodiments this request will be made directly by the source 414, but there is no technical reason that it cannot also be made by an intermediary acting on behalf of the source 414 (of course, there can be excellent policy reasons to not allow this). The request will include the assertion 422 of the source 414 and information about the contemplated transaction 424 (see e.g., TABLE 1). As discussed previously, such information will at least identify the targets 416, and may also set times and quantities of permitted releases of the decryption key 430 for the transaction 424. The request will also include the decryption key 430, if the source 414 is providing that.

In a step 456, the key server 420 determines if the assertion 422 of the source 414 is valid (and if at least minimal other information is provided, e.g., at least one target 416 is identified). If not, in a step 458 the key server 420 can take what is deemed appropriate action for the particular embodiment. Since the failed determination may be due to innocent error, it is expected that most embodiments will allow at least one corrected request. The key server 420 can, of course, log all attempted requests in the database 432.

If step 456 determines that the process 450 should continue, in a step 460 the key server 420 assigns a transaction ID 428 ("t-id" in the figures) and stores it along with the assertion 422 of the source 414 and a decryption key 430 in the database 432. Recall, as a matter of design or configuration, the encryption key 430 and the decryption key 430 may or may not be the same. If they are different, the key server 420 can store both if desired.

In a step 462, the key server 420 replies to the request by providing the transaction ID 428, and the encryption key 430 if it is providing that.

No steps are shown in FIG. 16 for the encrypting, sending, and receiving of the transaction 424. To keep things simple here these are treated generally as their labels imply, and more details are provided, below.

In a step 464, it is presumed that the target 416 has received the transaction 424 and already obtained an assertion 422 from the authentication authority 418. What this step then includes is receipt of another request by the key server 420. It is expected that in most embodiments this request will also be made directly by the target 416, but there is no technical reason that a request cannot be made by an intermediary. This request includes the transaction ID 428 that came with the transaction 424 and the assertion 422 of the target 416.

In a step 466, the key server 420 determines if the assertion 422 of the target 416 is valid (and if the transaction ID 428 is for a transaction 424 that the target 416 is presently authorized to view). If not, in a step 468 the key server 420 can take what is deemed appropriate action. Since a failed determination may here also be due to innocent error, it is expected that most embodiments will allow at least one corrected request. The key server 420 can, however, here also, log all attempt requests in the database 432.

If step 466 determines that the process 450 should continue, in a step 470 the key server 420 stores the assertion 422 of the target 416 in the database 432, associated with the transaction ID 428 and the identity of the target 416.

In a step 472, the key server 420 retrieves the decryption key 430, which was previously stored in association with the transaction ID 428, and replies to the present request by providing the decryption key 430.

Finally, in a step 474, the process 450 ends. Data is now established in the database 432 for nonrepudiation and audit purposes. Presumably, but with very high likelihood if the communication system 410 uses software that automates request-reply handling for the target 416 (e.g., the software module 26, FIG. 3), the transaction 424 is decrypted and viewed.

As noted in passing above, the act of using the encryption key 430 "cryptographically" binds the transaction 424 and the source 414. There are, however, different approaches and variations of those approaches that are suitable for this, and some representative examples are now presented.

If a public/private key system is employed, the source 414 can include the public key (the decryption key 430) in the assertion 422 it provides to the key server 420. The source 414 then effectively "signs" the transaction 424 by encrypting it using the corresponding private key (the encryption key 430) and cannot repudiate the transaction 424. This is conceptually similar to how PKI systems achieve nonrepudiation, but this approach employs the key server 420 and permits additional benefits to be obtained.

If a single key is used for both encryption and decryption, the source 414 and the key server 420 can cooperate to create a "seal" that will prove that the transaction 424 originated from the source 414. There can be many variations on this approach, and the following describes the inventors' presently preferred one. Many features in this are optional.

Here the source 414 requests the transaction ID 428 and encryption key 430 from the key server 420, as described previously, and the key server 420 provides these as well as a key-creation timestamp and an identity of the source 414. [Typically the identity will be an email address, but this is not necessarily the case. For instance, the key server 420 may use its customer number for identifying the source 414. Often the source 414, will full well know "its" identity, but "parroting" it back from the key server 420 and using that exact bit-for-bit copy in the next stage avoids possible errors.] The source 414 then combines the data for the transaction 424, the transaction ID 428, the timestamp, and the identity together and generates a hash. The source 414 encrypts the hash with a "salt," say, a randomly generated number, and this encrypted hash becomes the seal.

Next, the source 414 encrypts the data for the transaction 424, and this becomes what is actually sent to the targets 416. Note, here the source 414 creates the seal and the salt. It sends the key server 420 the seal, but not the transaction or the salt. The source 414 sends each target 416 the transaction 424, which is encrypted and includes the salt but (preferably) not the seal.

Upon receiving the transaction 424, the target 416 sends the transaction ID 428 and its assertion 422 to the key server 420. If all is in order, the key server 420 replies with the decryption key 430, the key-creation timestamp, the identity of the source 414, and the seal. With the decryption key 430, the target 416 decrypts the transaction 424, accesses the salt, and now recreates the process the source 414 used to create the seal. It combines the data for the transaction 424, the transaction ID 428, the timestamp, and the identity together and generates a hash. Then it then encrypts this hash with the salt. If the result matches the seal created by the source 414 and now provided from the key server 420, the source 414 cannot repudiate the transaction 424. This also prevents the target 416 from concocting a transaction 424, encrypting it with the decryption key 430, and later claiming that the transaction 424 originated from the source 414.

FIG. 17 is a flow chart depicting a suitable process 480 by which data established in the database 432 can be used to counter attempted repudiation by the source 414.

In a step 482, the process 480 starts. Presumably, data already has been established in the database 432 for a transaction 424.

In a step 484, a request to verify the source 414 is made to the key server 420, or to another system having at least read access to the database 432. Such a request can potentially come from a target 416 or any other party that can identify the subject transaction 424 in some manner (of course, a policy can impose limitations on this if desired). Most typically, identification will be by the transaction ID 428, but other data can potentially also be used to search the database 432 and determine the transaction ID 428 (e.g., a key 430, an assertion 422, actual transacting party 412 identity information, transaction 424 send or received times, etc.).

In a step 486, the identify of the source 414 is determined by inspecting the assertion 422 it initially provided, which has been stored all along in association with the transaction ID 428.

In a step 488, the present request is replied to by verifying the source 414. The reply and the nature of verification can, however, take many forms. For instance, the reply can simply identify the source 414. Alternately, if the request included a suspected source 414, the reply can merely include a "Yes" or "No" answer and not provide an actual identify. The reply can even include the decryption key 430 for the transaction 424, presumably only in appropriate circumstances (e.g., when a court has so ordered). Or the request can include the encrypted transaction 424 and the reply can include the decrypted transaction 424, again presumably only in appropriate circumstances.

Finally, in a step 490, the process 480 ends. The source 414 is now unable to plausibly repudiate the transaction 424.

FIG. 18 is a flow chart depicting a suitable process 500 by which data established in the database 432 can be used to counter attempted repudiation by the target 416.

In a step 502, the process 500 starts. Presumably, data has already been established in the database 432 for a transaction 424.

In a step 504, a request to verify that the target 416 received the transaction 424 is made to the key server 420 or another system having at least read access to the database 432. Such a request may come from the source 414 or any other party (subject to policy considerations) that can identify the subject transaction 424 and a suspected target 416 in some way. Most typically, identification will be by the transaction ID 428, but here as well, other data can potentially also be used to search the database 432.

In a step 506, whether the target 416 received the transaction 424, received it a specific number of times, or received it at one or more specific times is determined by inspecting the target assertions 422 and other data (see e.g., TABLE 1) that has been stored in association with the transaction ID 428. If this does not include an assertion 422 of the target 416, or includes one but other criteria are not met, in a step 508 an appropriate reply is made to the request.

Alternately, if the database 432 reflects that an assertion 422 of the target 416 is present in association with the transaction ID 428, and also that any optional criteria are met, in a step 510 an appropriate reply for this case is made to the request.

Note, the replies and the nature of verification can also take many forms here. For instance, the reply can simply verify that the target 416 asked for and was provided the decryption key 430 for the subject transaction 424. Alternately, if the request asks and the embodiment permits, the reply can inform how often and when the target 416 was provided the decryption key 430. The reply can also include the decryption key 430, presumably only in appropriate circumstances. Or the request can include the encrypted transaction 424 and the reply can include the decrypted transaction 424, again presumably only in appropriate circumstances.

Finally, in a step 512, the process 500 ends. The target 416 is now unable to plausibly repudiate the transaction 424.

As for auditing the passage of transactions 424 between sources 414 and targets 416, the database 432 will contain extensive data suitable for this. As long as such data is stored with timestamps and remains in the database 432, responding to audit requests should be a straightforward task of lookup and report generation.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present invention, which has been illustrated herein with the communication system 410 as an example, is well suited for application in current network environments, such as the Internet, to implementing nonrepudiation and audit using authentication assertions and key servers. As has been described above, prior art approaches have still not addressed all concerns with the use digital communications. In particular, it has not addressed the two particularly vexing problems of transaction nonrepudiation and auditing.

The present invention is largely transparent to transacting parties, transaction sources and targets. The authenticated identities of transacting parties are used to implement nonrepudiation by either party. Additionally, by persistently storing information from or the complete authentication assertion of the transacting party at a key server, both nonrepudiation and audit may be provided using the same system. In contrast, existing technologies (e.g., Public Key Infrastructure, PKI) burden their users with maintaining a private key and actively using it for producing a signature. Additionally, a party needing to verify a transaction must have a copy of, or otherwise retrieve the digital certificate of the transaction signer. Moreover, such existing technologies do not provide a single service for both nonrepudiation and audit.

The present invention may still interoperate with PKI, but it does not require it. A transaction source, target, or both can use any method, including PKI, to provide nonrepudiation of origin and receipt. Furthermore, the method the transaction source uses may be the same or different than the method the transaction target uses. In contrast, PKI-based technologies require the use of an infrastructure that is trusted by all parties (transaction source and target). Also, non-PKI technologies (e.g., storing a transaction log in a database) use a completely different mechanism and do not interoperate with PKI.

The present invention is able to provide varying degree of strengths. It associates the degree of strength with the authentication of the transacting party. By increasing the strength of authentication (e.g., from a user ID/password to a two factor authentication), the transacting party dynamically and automatically increases the strength of nonrepudiation. In contrast, most prior art technologies only offer a single level of strength for nonrepudiation. For example, in PKI the strength of nonrepudiation is equivalent to the assurance level of the underlying certificate. Here a party can only change the strength by using a different certificate, having a different level of assurance.

The present invention is also able to enforce specific trust rules. It enables flexible trust rules that follow business relationships. For example, an organization can enforce the rule of authenticating each transacting party, thereby enforcing a rule of only trusting its own authentication assertions. Or, an organization can enforce a rule of owning and maintaining its own key server, thereby enforcing a rule of only trusting its own audit server. In contrast, most prior art technologies provide rigid trust rules for nonrepudiation and audit. Using PKI again as an example, in a system based on it the party that verifies the transaction must trust the certificate of the signer. In prior art non-PKI based systems, the verifier must trust the system that keeps the transaction logs.

For the above, and other, reasons, it is expected that the present invention will have widespread industrial applicability and it is expected that the commercial utility of the present invention will be extensive and long lasting.

The invention claimed is:

1. A method for a transaction source and a transaction target to exchange a transaction that cannot be repudiated, the method comprising:
  (a) receiving a first request for a transaction identifier to identify the transaction, wherein said request includes a source authentication assertion;
  (b) verifying said source authentication assertion;
  (c) storing said transaction identifier and information from said source authentication assertion, thereby establishing information making the transaction source unable to plausibly repudiate once it encrypts and sends the transaction;
  (d) providing said transaction identifier in reply to said first request so that the transaction and said transaction identifier can be sent to the transaction target;
  (e) receiving a second request for a decryption key to decrypt the transaction once it has been received by the transaction target, wherein said second request includes said transaction identifier and a target authentication assertion;
  (f) verifying said target authentication assertion;
  (g) storing information from said target authentication assertion with the transaction identifier; and
  (h) providing said decryption key in reply to said second request so that the transaction can be decrypted, thereby establishing information making the transaction target unable to plausibly repudiate being a recipient of the transaction.

2. The method of claim 1, wherein said step (d) includes also providing an encryption key to encrypt the transaction.

3. The method of claim 1, the method further comprising:
(i) receiving an information request for source information about the transaction source, wherein said information request includes said transaction identifier;
(j) retrieving at least some of said information from said source authentication assertion stored in said step (c) with said transaction identifier and determining said source information therefrom; and
(k) providing said source information in reply to said information request.

4. The method of claim 1, the method further comprising:
(i) receiving an information request for target information, wherein said information request includes said transaction identifier and information identifying the transaction target;
(j) determining if said information identifying the transaction target matches with any said information from said target authentication assertion stored with the transaction identifier stored in said step (g) and determining said target information therefrom; and
(k) providing said target information in reply to said information request.

5. A method for establishing a transaction as nonrepudiate able by a transaction source that is the origin of the transaction, the method comprising:
(a) receiving a request for a transaction identifier to identify the transaction, wherein said request includes a source authentication assertion;
(b) verifying said source authentication assertion;
(c) storing said transaction identifier and information from said source authentication assertion; and
(d) providing said transaction identifier in reply to said request, thereby establishing information making the transaction source unable to plausibly repudiate being the origin of the transaction.

6. The method of claim 5, wherein said step (d) includes also providing an encryption key to encrypt the transaction.

7. The method of claim 5, the method further comprising:
(e) receiving an information request for source information about the transaction source, wherein said information request includes said transaction identifier;
(f) retrieving at least some of said information from said source authentication assertion stored in said step (c) with said transaction identifier and determining said source information therefrom; and
(g) providing said source information in reply to said information request.

8. The method of claim 7, wherein said source information indicates who the transaction source actually is.

9. The method of claim 7, wherein:
said information request received in said step (e) also includes information identifying a party believed to be the transaction source; and
said source information provided in said step (g) indicates merely whether said party is the transaction source, thereby responding to said information request without specifically identifying the transaction source.

10. The method of claim 7, wherein:
said step (c) includes also storing a decryption key usable to decrypt the transaction; and
said step (g) includes also providing said decryption key, thereby facilitating decryption of the transaction by a party making said information request even when said party is not the transaction source or a target of the transaction.

11. The method of claim 7, wherein:
said information request received in said step (e) also includes the transaction; and
said step (g) includes decrypting the transaction before providing said source information in reply to said information request.

12. The method of claim 11, wherein:
said information request received in said step (e) also includes information identifying a party believed to be the transaction source; and
said source information provided in said step (g) indicates merely whether said party is the transaction source, thereby responding to the second request without specifically identifying the transaction source.

13. The method of claim 11, wherein said step (g) includes also providing the transaction in decrypted form in said reply to said information request, thereby facilitating a party making said information request being able to confirm the content of the transaction even when said party is not the transaction source or a target of the transaction.

14. A method for establishing a transaction as nonrepudiate able by a transaction target that is a recipient of the transaction, wherein a transaction identifier identifying the transaction and a decryption key usable to decrypt the transaction have been pre-stored, the method comprising:
(a) receiving a request for the decryption key, wherein said request includes the transaction identifier and a target authentication assertion;
(b) verifying said target authentication assertion;
(c) storing information from said target authentication assertion with the transaction identifier; and
(d) providing the decryption key in reply to said request, thereby establishing information making the transaction target unable to plausibly repudiate being a recipient of the transaction.

15. The method of claim 14, the method further comprising:
(e) receiving an information request for target information, wherein said information request includes said transaction identifier and information identifying the transaction target;
(f) retrieving at least some of said information from said target authentication assertion stored in said step (c) with said transaction identifier and determining said target information therefrom; and
(g) providing said target information in reply to said information request.

16. The method of claim 15, wherein:
said step (g) includes also providing said decryption key, thereby facilitating decryption of the transaction by a party making said information request even when said party is not the transaction source or a transaction target.

17. The method of claim 15, wherein:
said information request received in said step (e) also includes the transaction; and
said step (g) includes decrypting the transaction before providing said identity information.

18. The method of claim 17, wherein said step (g) includes also providing the transaction in decrypted form in said reply to said information request, thereby facilitating a party making said information request being able to confirm the content of the transaction even when said party is not the transaction source or a transaction target.

19. A system for a transaction source and a transaction target to exchange a transaction that cannot be repudiated, comprising:

a computerized key server;

said key server suitable for receiving a first request via a network for a transaction identifier to identify the transaction, wherein said first request includes a source authentication assertion;

said key server suitable for receiving a second request via said network for a decryption key usable to decrypt the transaction, wherein said second request includes said transaction identifier and a target authentication assertion;

said key server suitable for verifying said source authentication assertion and said target authentication assertion;

said key server suitable for storing said transaction identifier, information from said source authentication assertion, and information from said target authentication in association in a database;

said key server suitable for providing a first reply to said first request via said network that includes said transaction identifier; and said key server suitable for providing a second reply to said second request via said network that includes said decryption key, thereby establishing information making the transaction source unable to plausibly repudiate once it encrypts and sends the transaction and also making the transaction target unable to plausibly repudiate once it is provided said decryption key.

20. The system of claim 19, wherein said key server is further suitable for providing an encryption key to encrypt the transaction in said first reply.

21. The system of claim 19, wherein:

said key server is further suitable for receiving an information request for source information about the transaction source, wherein said information request includes said transaction identifier;

said key server is further suitable for retrieving said information from said source authentication assertion stored with said transaction identifier from said database and determining said source information therefrom; and said key server is further suitable for providing said source information in reply to said information request.

22. The system of claim 19, wherein:

said key server is further suitable for receiving an information request for target, wherein said information request includes said transaction identifier and information identifying the transaction target;

said key server is further suitable for determining if said information identifying the transaction target matches with any said information from said target authentication assertion stored with the transaction identifier and determining said target information therefrom; and said key server is further suitable for providing said target information in reply to said information request.

23. A system for establishing a transaction as nonrepudiate able by a transaction source that is the origin of the transaction, comprising:

a computerized key server;

said key server suitable for receiving a request via a network for a transaction identifier to identify the transaction, wherein said request includes a source authentication assertion;

said key server suitable for verifying said source authentication assertion;

said key server suitable for storing said transaction identifier and information from said source authentication assertion in a database; and said key server suitable for providing a reply via said network that includes said transaction identifier, thereby establishing information making the transaction source unable to plausibly repudiate once it encrypts and sends the transaction.

24. The system of claim 23, wherein said key server is further suitable for providing an encryption key to encrypt the transaction in said reply.

25. The system of claim 23, wherein:

said key server is further suitable for receiving an information request for source information about the transaction source, wherein said information request includes said transaction identifier;

said key server is further suitable for retrieving information from said source authentication assertion stored with said transaction identifier from said database, and determining said source information therefrom; and said key server is further suitable for providing said source information in reply to said information request.

26. A system for establishing a transaction as nonrepudiate able by a transaction target that is a recipient of the transaction, wherein a transaction identifier identifying the transaction and a decryption key usable to decrypt the transaction have been pre-stored in a database, comprising:

a computerized key server;

said key server suitable for receiving a request via a network for the decryption key, wherein said request includes the transaction identifier and a target authentication assertion;

said key server suitable for verifying said target authentication assertion;

said key server suitable for storing information from said target authentication assertion with the transaction identifier in the database; and said key server suitable for providing a reply via said network that includes the decryption key, thereby establishing information making the transaction target unable to plausibly repudiate.

27. The system of claim 26, wherein:

said key server is further suitable for receiving an information request for target information, wherein said information request includes said transaction identifier and information identifying the transaction target;

said key server is further suitable for retrieving at least some of said information from said target authentication assertion stored with said transaction identifier and determining said target information therefrom; and said key server is further suitable for providing said target information in reply to said information request.

* * * * *